US 6,717,589 B1

(12) United States Patent
Grillo et al.

(10) Patent No.: US 6,717,589 B1
(45) Date of Patent: Apr. 6, 2004

(54) COMPUTERIZED HELP SYSTEM WITH MODAL AND NON-MODAL MODES

(75) Inventors: Pete Grillo, Portland, OR (US); Alvin Pivowar, Portland, OR (US)

(73) Assignee: Palm Source, Inc., Sunnyvale, CA (US)

( * ) Notice: Subject to any disclaimer, the term of this patent is extended or adjusted under 35 U.S.C. 154(b) by 0 days.

(21) Appl. No.: 09/527,939

(22) Filed: Mar. 16, 2000

Related U.S. Application Data

(60) Provisional application No. 60/124,865, filed on Mar. 17, 1999.

(51) Int. Cl.[7] ................................................ G06F 3/14
(52) U.S. Cl. ...................................... 345/715; 345/711
(58) Field of Search ................................. 345/711, 712, 345/715, 709, 708, 706, 744–747, 748–749, 854–855, 817–824, 826–828, 761–762, 773

(56) References Cited

U.S. PATENT DOCUMENTS

| | | | | |
|---|---|---|---|---|
| 5,546,521 A | * | 8/1996 | Martinez | 345/708 |
| 5,790,974 A | | 8/1998 | Tognazzini | 701/204 |
| 5,918,232 A | * | 6/1999 | Pouschine et al. | 707/103 |
| 6,058,415 A | | 5/2000 | Polcyn | 709/200 |
| 6,112,024 A | * | 8/2000 | Almond et al. | 345/749 |
| 6,138,245 A | | 10/2000 | Son et al. | 713/400 |
| 6,212,494 B1 | * | 4/2001 | Boguraev | 704/9 |
| 6,212,509 B1 | * | 4/2001 | Pao et al. | 706/16 |
| 6,335,738 B1 | * | 1/2002 | Englefield et al. | 345/744 |
| 6,342,907 B1 | * | 1/2002 | Petty et al. | 345/762 |
| 6,430,571 B1 | * | 8/2002 | Doan et al. | 707/103 |

* cited by examiner

*Primary Examiner*—Steven Sax
(74) *Attorney, Agent, or Firm*—Wagner, Murabito, & Hao LLP

(57) ABSTRACT

A non-modal help mode uses a verb/object paradigm where the current context of the application program for which the user needs help is determined and a help screen is provided which shows all of the actions that can be taken from that context. The non-modal help system includes a display screen providing a window for a number of output displays of an application program, a collection of pre-defined images mapped to the output displays by their context, a user input device for initiating non-modal help, and a non-modal displayer which displays one of the predefined images within the window in the place of its contextually-related output display. Preferably, the predefined images are stored as static bit map images including a dithered representation of the context in which the help was requested and a number of help balloons strategically positioned on the dithered image. Even more preferably, the balloons are positioned manually by a graphic artist to maximize their placement on the dithered image. By providing a balloon to described the functionality of every (or most) of the active elements, a user is provided with a quick framework or "Skeleton" view of the meaning and operation of the various elements in the display.

32 Claims, 24 Drawing Sheets

COMPUTERIZED HELP SYSTEM WITH MODAL AND NON-MODAL MODES

CROSS REFERENCE TO RELATED APPLICATIONS

The present application claims the benefit of U.S. Provisional Application No. 60/124,865 filed Mar. 17, 1999, incorporated herein by reference.

BACKGROUND OF THE INVENTION

This invention relates generally to computerized help systems and, more particularly, to computerized help systems for personal computer application programs.

Personal computer systems have become ubiquitous in both the office and the home because they are powerful and flexible general purpose machines capable of running ("executing") a wide variety of application programs. These application programs can range from the simple to the exceedingly complex. Commonly used application programs are word processors, spreadsheets, calendars, database programs, and Internet Web browsers, among others.

The level of sophistication of personal computer users varies considerably from that of a complete novice to the expert or "guru." However, all users tend to, at some time or another, need some help or assistance in using an application program. This help can be derived from the application program vendor, a more knowledgeable user, a printed manual for the application program software, or by computerized ("on-screen") help. The on-screen help can be provided by the application program itself, a separate help program, or as on-line help from a local or remote computer system.

Most modern personal computer systems use a "windowing" type protocol wherein displays created by application programs are created within one or more windows on the screen of the computer. The windows can range in size from the entire display screen to a small area on the display screen. Typically, these windows are "framed" such that the images within the window are more easily distinguishable from other images on the computer screen. The windows may be provided by the operating system (such as the Microsoft Windows operating systems, the Macintosh operating systems, or Unix operating systems), or may be provided by programs running on the computer system, such as the Java Virtual Machine (JVM).

Windowing systems are often referred to as "modal" systems in that only one window at a time is available for user input. To operate a windowing system in anything other than a modal fashion would create considerable confusion in that a user would not know which window of the various windows displayed on the screen is currently active.

Most on-screen help systems are modal-type help systems in that they are provided in their own help window which is separate from the window being used by the application program from which help was requested. The problem with these modal help systems is that they require a certain level of knowledge and sophistication by a user. That is, a user has to know how to open the help window, navigate through the help system, and then close the help window. While these are not difficult tasks, it has been found to be one which eludes novice and occasional users of personal computers.

Because of the difficulties encountered with modal on-screen help systems, a few non-modal help systems have been developed. One example of a non-modal on-screen help system is "balloon help" available in some later versions of the Macintosh operating system available from Apple Computer, Inc. With balloon help, the Macintosh operating system displays a small balloon enclosing textual information concerning an object that has been engaged with the on-screen cursor ("pointer") for a predetermined period of time. In general, balloon help is only available at the system or "finder" level of the Macintosh operating system, unless it has been specifically programmed into application programs.

Many users of Macintosh computer systems end up turning off balloon help because the information that it provides does not offset the sometimes annoying characteristics of balloon help. One of these annoying characteristics is that balloon help tends to pop up as the cursor is moved over objects on the screen whether help was needed or not. Another deficiency is that the balloons are placed by software (typically the operating system itself), sometimes resulting in other objects on the screen being obscured.

Microsoft Windows Operating Systems, such as Windows 95, Windows 98, and Windows NT, provide a non-modal type of help known as "tool tips" that is somewhat similar to that of balloon help. Microsoft tool tips are primarily application-based in that they evolved from the Microsoft Excel for Windows 3.1 Application Program. More particularly, tool tips are primarily tied to the tool bar of an application program, although it is sometimes also used in a status bar of the application program. To use tool tips, the cursor is held over a button on the tool bar without activating the button, and a small yellow box will appear on the screen having a one-line explanation as to the function of that button. Since tool tips are pretty much restricted to use on the tool bar and, sometimes, the status bar, it tends to be less obtrusive than the Macintosh balloon help.

While the balloon help of Macintosh Computer Systems and the tool tips provided on Microsoft Windows computer systems can provide useful non-modal help, they tend to be quite limited in nature and, under some circumstances, can actually promote confusion in the user. This is due, in part, to the fact that both balloon help and tool tips adopt a object/verb mode for providing help wherein an object is selected and then actions that can be taken with respect to that object are listed. This object/verb paradigm is exemplified by a modal-type help that is also provided under the Windows Operating System. That is, a right mouse button click will result in a "pop-up" window on the screen of the computer operating under Microsoft Windows Operating System, and will provide a list of every action that can be performed on the selected object on the screen. Unfortunately, using an object/verb mode for communicating help ignores the context within which the help is requested. For example, tool tips will provide help for buttons on a toolbar that are not currently active.

Another problem with the object/verb paradigm is that an object needs to be selected before its function is displayed. Therefore, if the user does not know that a particular object has a function in a particular context, he will not know that he should activate, for example, balloon help or tool tips, and thus will not receive the desired assistance.

SUMMARY OF THE INVENTION

The present invention provides non-modal help which uses a verb/object paradigm. That is, the current context of the application program for which the user needs help is determined, and a help screen is provided which shows all of the actions that can be taken from that context. Unlike an object/verb paradigm, actions that cannot be taken within that context will not be listed, and no possible actions will be missed by the user.

Briefly, a computerized non-modal help system includes a display screen providing a window for a number of output displays of an application program, a collection of pre-defined images mapped to the output displays by their context, a user input device for initiating non-modal help, and a non-modal displayer which displays one of the pre-defined images within the window in the place of its contextually-related output display. Preferably, the pre-defined images are stored as static bit map images including a dithered representation of the context in which the help was requested and a number of help balloons strategically positioned on the dithered image. Even more preferably, the balloons are positioned manually by a graphic artist to maximize their placement on the dithered image. By providing a balloon to described the functionality of every (or most) of the active elements, a user is provided with a quick framework or "skeleton" view of the meaning and operation of the various elements in the display.

In a preferred embodiment of the present invention, the screen and the user input device form a part of a client computer system. The help system can further include a server computer system coupled to the client computer system, such as by a TCP/IP network. Common forms of TCP/IP networks are referred to as Intranets and the Internet. In this embodiment, the client computer system supports a browser process, and the server computer system supports a server process. The computerized processes running on the client computer system comprise Applets that are delivered from the server computer system to the client computer system via the network. However, once the Applets are running on the client computer system, they communicate directly with the server processes through, for example, sockets in a Java-based system.

In another aspect of the present invention, a computerized help system includes a display screen providing a process window for a number of output displays of a computerized process, a user input device for initiating non-modal and modal help, non-modal help for displaying help within the process window and response to a request for non-modal help by the user, and modal help for displaying help within a help window in response to a request for modal help by the user. Preferably, the user input device is a pointer mechanism wherein the modal help is initiated by a help button displayed on the screen. The non-modal help is preferably initiated by a pointer positioned within a predetermined distance of the help button by the pointer mechanism under the control of the user. The non-modal help preferably includes a collection of pre-defined bitmap images contextually related to the output displays, where each bitmap image includes a non-literal representation of its related output display and textual help within the representation.

A method for providing non-modal help in accordance with the present invention includes the operations of detecting a user request for non-modal help with respect to a dynamic application display, determining a context of the dynamic application display, retrieving a static image contextually related to the dynamic application display, where the static image includes a non-literal representation of the dynamic application display and textual help within the representation, and displaying the static image in the place of the dynamic application display.

An advantage of the present invention is that non-modal help is provided which operates on a verb/object paradigm rather than the object/verb paradigm of the prior art. The non-modal help is therefore very useful, even for novice or very occasional personal computer users in that it presents in a straightforward fashion the majority, if not all, of the options available to a user within the context of the application program.

The present invention is also advantageous in that it cleanly ties together both non-modal and modal help by using the approach of a cursor to a modal help button as the indication that non-modal help should be provided to the user. That is, a user can enter non-modal help by simply moving a cursor to within a predetermined distance of the modal help button, and can return to the application program by moving the cursor back to the display of the application program.

These and other advantages of the present invention will become apparent to those skilled in the art upon a reading of the following descriptions of the invention and a study of the several figures of the drawing.

DETAILED DESCRIPTION OF THE PREFERRED EMBODIMENTS

Figure 1:
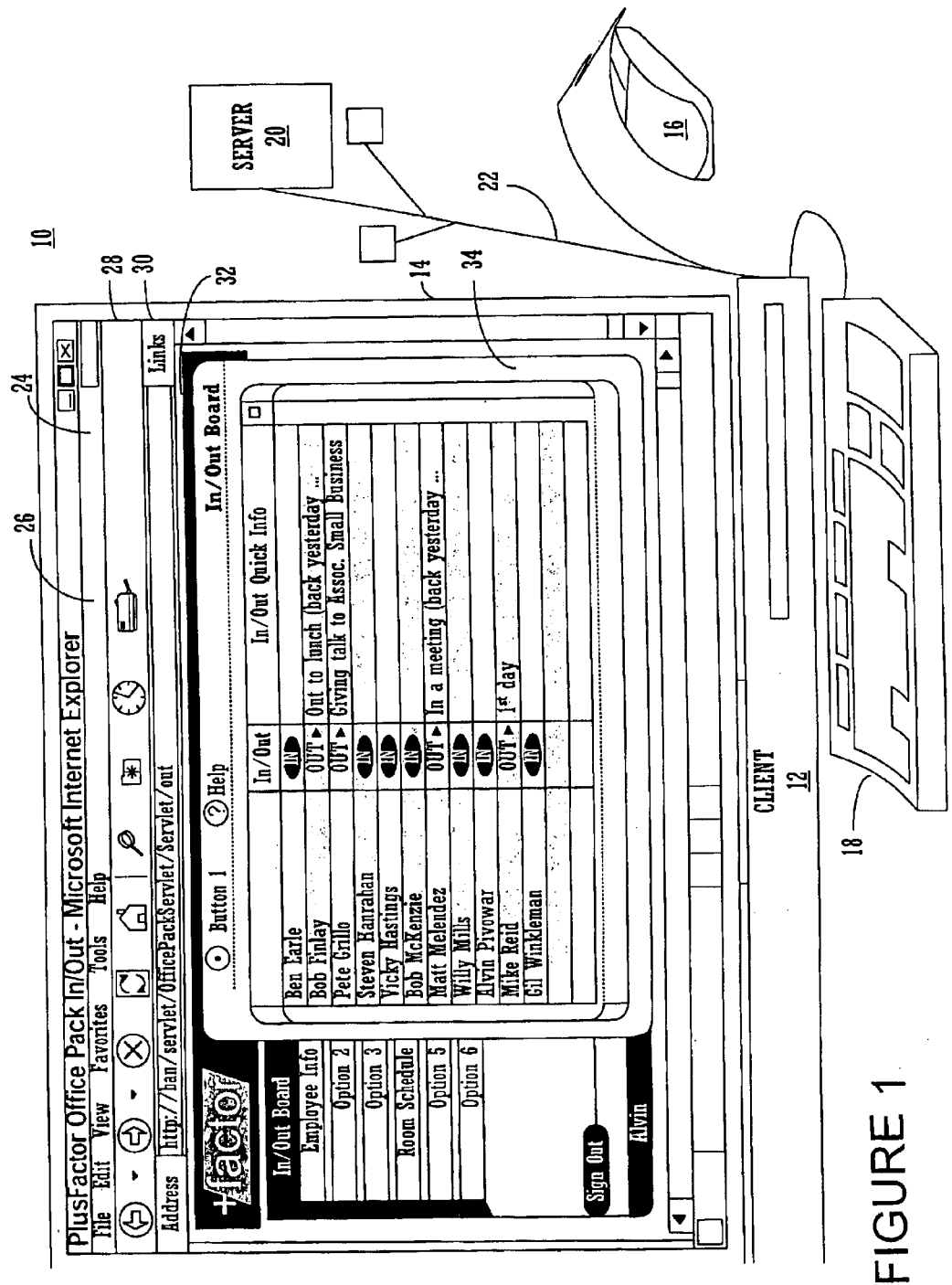
FIG. 1 is a representation of a computerized help system in accordance with the present invention.

In FIG. 1, a computerized help system 10 includes a computer 12, a computer display screen 14, and user input devices such as a mouse 16 and a keyboard 18. Optionally, the computerized help system can include a server computer system 20 coupled to the computer 12 by a network 22.

The computer system 12 is preferably a personal computer system capable of running a Windows operating system provided by Microsoft, Inc. of Redmond, Calif. Alternatively, the computer system 12 can be a Macintosh computer system provided by Apple Computer, Inc. of Cupertino, Calif., a workstation provided by Sun Microsystems, Inc. of Mtn. View, Calif. or Hewlett Packard Company of Palo Alto, Calif., or any other windowing computer system. The monitor 14 is preferably a standard graphical display monitor which be based on cathode ray tube (CRT), liquid crystal display (LCD), plasma emission, and other display technologies. Such displays or "monitors" are available from a variety of sources. The mouse 16 is one example of a class pointing devices which include track balls, joysticks, touch pads, etc. A keyboard 18, typically including cursor, function, and control keys in addition to the standard alphanumeric keyboard is also standard and is available from a variety of sources.

In an embodiment of the present invention, the computerized help system is fully implemented on the computer system 12. In other embodiments, the computerized help system is implemented over a network system to which the computer 12 is coupled. Another computer 20 on the network 22 can be designated as a "server" as either a part of its functionality or as its entire functionality. That is, the server 20 may simply be another computer on the network 22 which provides server services to one or more computers on the network, while still providing other services to local or remote users. Alternatively, the server 20 can be dedicated to server functions.

Illustrated on display screen 14 is a network browser window 24 having standard pull-down menus 26 and navigation buttons 28. The current URL for the browser is shown in a small window 30. The network browser 24 illustrated in this FIG. 1 is the Microsoft Internet Explorer browser, although other network browsers, such as the Netscape Navigator provided by Netscape Communications, Inc. of Mtn. View, Calif. are also suitable.

Within the network browser window 24 is a display window 32 which is displaying a web page 34 having the universal resource locator (URL) indicated in window 30. It should be noted that the web page 34 does not need to be accessed over a network 22, although it may be accessed over the network 22. That is, the web page 34, and other associated web pages, may be sorted locally on the computer 12. The web page 34 as seen in FIG. 1 is the "in/out home screen" of an illustrative application program using the help system of the present invention. While the help system will be described in terms of this application program, it will be appreciated by those skilled in the art that the concepts of the modal and non-modal help features of the present invention are generally applicable to a wide variety of application programs.

Figure 2:
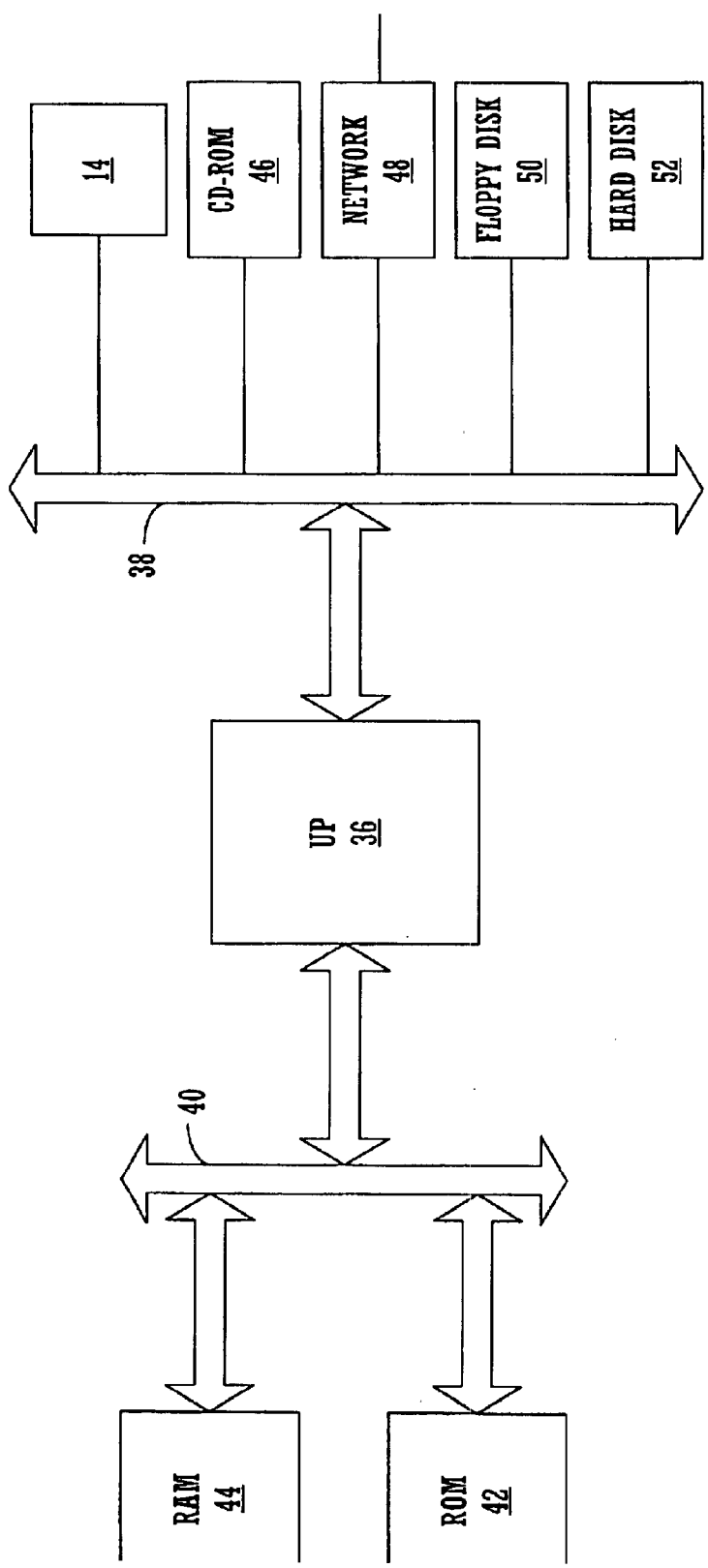
FIG. 2 is a block diagram of a client computer system and a server computer system used in the present invention.

In FIG. 2, a block diagram of an exemplary computer system 12 in accordance with the present invention includes a microprocessor 36, an I/O bus 38, and a memory bus 40. The microprocessor 36 is coupled to both the I/O bus 38 and the memory bus 40 as will be appreciated by those skilled in the art. Often, the microprocessor 36 is coupled to the buses by a specialized set of chips known as a "chip set" which perform a number of bus, I/O, and memory functions.

Memory such as ROM memory 42 and RAM memory 44 are typically coupled to the memory bus 40, while they can also be coupled to other buses such as the I/O bus 38. ROM 42 and RAM 44 are two examples of computer readable media wherein data and instructions can be stored.

A number of devices known as "peripherals" can be coupled to the microprocessor 36 via the I/O bus 38. For example, the display screen 14 can be coupled to the I/O bus through a suitable video interface. Other examples of typical peripherals are CD-ROM drives 46, a network interface card 48, a floppy disk drive 50, and a hard disk drive 52. Since all of these peripherals can store data and program instructions, these peripherals are further examples of computer readable media. The architecture of the computer system 12 of FIG. 2 is also applicable to other computer systems of the help system 10, such the server 20 (see FIG. 1).

Figure 3:
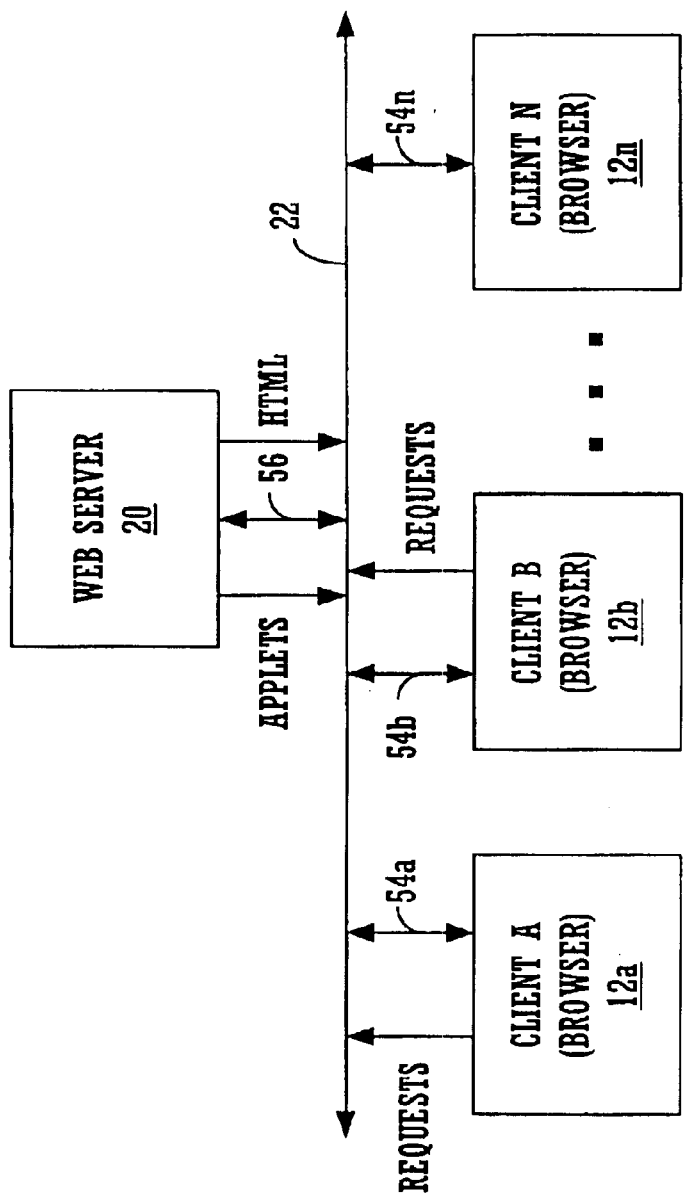
FIG. 3 is a block diagram of a networked computerized help system of the present invention.

In FIG. 3, a block diagram of a network version of the help system 10 includes a number of client computer systems labeled 12A, 12B, . . . 12N. On each of the clients, a suitable web browser, such as the aforementioned Microsoft Internet Explorer web browser, is used to communicate with other processes in the help system 10. More particularly, the client computer 12A, 12B . . . 12N are coupled to the network 22 by network connections by 54A, 54B . . . 54N. A web server 20 is likewise coupled to the network 22 by a network connection 56. As will be appreciated by those skilled in the art, the network 22 can be the backbone of a TPC/IP protocol network such as the Internet, an Intranet or an Extranet. In the case of the Internet, the network connections 54A–54N and 56 are typically accomplished through one or more Internet Service Providers (ISPs).

In operation, the web server 20 is typically accessible through the Internet or other TPC/IP protocol network on a continuous basis. The clients, such as client 12A, is often not always connected to the network 22. For example, in the case of personal computers, the computers are often turned off when not in use. Furthermore, some network connections are not always operational even though the computer 12A may be turned on. For example, if the client computer system 12A is using a commercial service such as America On-Line (AOL) as their ISP, they will often dial into the system when they desire network services. However, in the context of this discussion, it will be assumed that a client computer 12A has a current connection to the network 22.

When client computer 12A activates or "launches" its network browser a "home" web page URL (usually stored as a preference) causes the browser to send a request out onto the network for that web page. In response, a web server (such as web server 20), will provide Hypertext Marked Up Language (HTML) file to the browser to generate a display within the browser window. This HTML can include text, graphics, images (such as GIF images), and a number of other types of communication media. In addition, the web server may send an "applet" to the browser. These applets are small programs designed to run within the browser window to provide some form of user service. For example, the applet can provide moving imagery, interactive program functions, etc. Additional requests sent by the client computer 12A will result in additional HTML and possibly additional applets being sent in return.

Figure 4A:
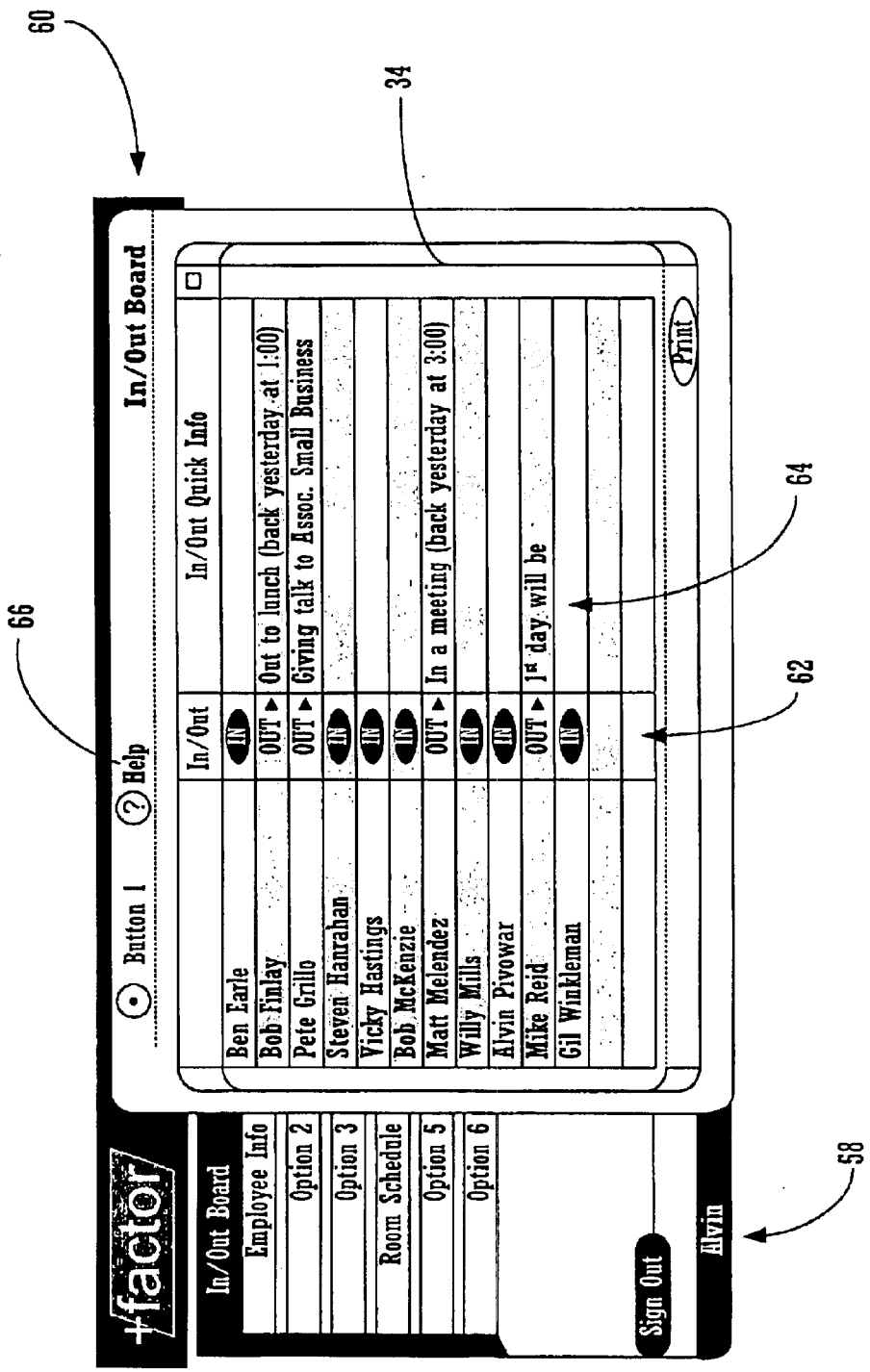
FIG. 4A is an illustration of a home screen of an application program.

In FIG. 4A an "in/out home screen" is shown by way of example. This particular home screen is the most common entry point into an exemplary office productivity system. The system will be described by way of example, and not by way of limitation, to provide a context for the help system of the present invention.

In the example of FIG. 4A, the web page 34 (see also FIG. 1) displays a list of employees and whether they are in or out of the office. There is also a small remarks field to indicate where they are when they are out. In the exemplary application, this in/out home screen will be the entry point into the productivity software as long as there is at least one employee in the company. Alternatively, the home screen can be defined as the screen that was last left by a particular user.

The in/out screen 34 has several sections. One is the chooser section 58, another is the title bar section 60, and yet another is the main display section 62. The chooser section 58 in a preferred implementation of the present invention allows a user to select from a choice of applets which control the content of the web page 34. The title bar 60 not only includes the title of the current page, but also allows preferences to be set and provides for a help function in accordance with the present invention. The main display 62 is where the actual data is formatted and displayed.

While the various sections of the web page 34 may seem self explanatory, there are a number of subtleties that may not be apparent to a new user or to a user who is not very skilled in computer operations. The present invention provides at least one and preferably two or more methods for aiding the user in operating the software. As will be discussed in greater detail subsequently, two preferred methodologies for providing help in accordance with the present invention include a non-modal help mode and a modal help mode.

As used herein, a "modal" mode is one which requires a user to activate a window which is separate from the window that was currently active in order to receive on-screen help. Thus, traditional help windows are modal while the aforementioned balloon help and tool tips are non-modal. A preferred embodiment of the present invention further preferably provides non-modal help using a verb/object paradigm, as will be explained below.

In the event that a user of a client machine 12 feels that he is in need of help with an application program, he causes a cursor 64 to move toward the help "button" 66 in the title bar 60. In one embodiment of the present invention, the proximity of the cursor 64 to the help button 66 will cause the display of a non-modal help screen as seen in FIG. 4B.

Figure 4B:
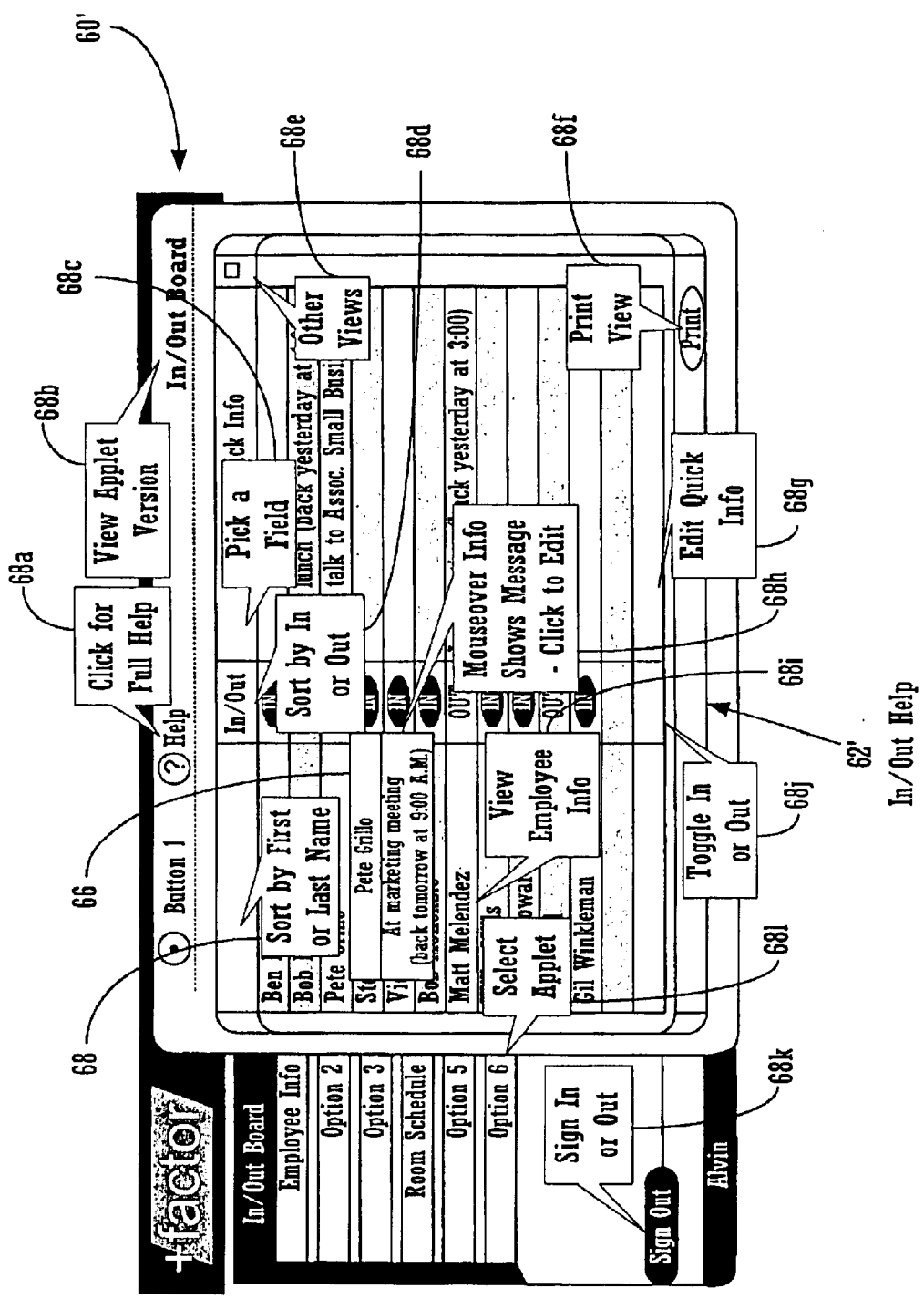
FIG. 4B is an illustration of non-modal help being provided with respect to the context of the view of FIG. 4A.

In FIG. 4B, a display section 64' and a title bar section 60' replaces the main display section 62 and the title bar section 60 of FIG. 4A. This replacement can take place in a variety of ways, as will be appreciated by those skilled in the art. For example, the sections 64' and 60' can be caused to "over lie" sections 62 and 60. Preferably, the sections 62' and 60' are visually distinctive from the sections 62 and 60, such as being presented in a lighter or "half tone" image view. Such half tone images will also be referred to herein as "dithered" images, although half tone images can be created by methods other than dithering.

While the sections 62' and 60' are discussed as if they were separate, it is preferred that the entire area comprising the sections 62' and 60' are stored as a bitmap within the help system 10. This bit map is most preferably stored on the client machine 12, although it may also be stored elsewhere on the network 22, such as on the server 20.

It should also be noted that the section 62' is not a precise image of the display within section 62. That is, it is representative (i.e. contextually related) of the image in section 62 of FIG. 4A, but is not the same as that image. For example, there are different employees listed on the in/out board, whether they are in or out has been changed, etc. Further, in section 62' a window 66 has been opened and a number of balloons 68A–68L are all displayed on the screen. It should be noted that this window 66 and the balloon 68A–68L are all preferably part of the aforementioned bitmap of the sections 62' and 60'. That is, these balloon windows and other graphics were created and stored in a bitmap (preferably by a graphic artist) in order to maximize readability and to best present help to the end user.

A window 66 in section 62' illustrates a "mouse over" feature which provides greater detail as to an employee's location. The balloon 68H explains about the window and how to edit the content of the window. As to some of the other balloons, the balloon 68A indicates the purpose of the help button, balloon 68B indicates that clicking on the title of the in/out board gives information about the applet version, etc.

It should be noted that the balloons 68 of FIG. 4B are provided on a verb/object paradigm in that only the functions that can be currently implemented from that screen are described. Inactive functionality is not shown in this balloon help. This has been found to be far less confusing to a user than the object/verb paradigm used in the prior art. It will further be appreciated that all (or virtually all) objects on the screen that do have a functionality are associated with a balloon description. This is in marked contrast to the prior art which only shows one balloon at a time due to an object/verb paradigm.

It will therefore be appreciated that the present invention provides non-modal help which uses a verb/object paradigm. That is, the current context of the application program for which the user needs help is determined, and a help screen is provided which shows all of the actions that can be taken from that context. Unlike an object/verb paradigm, actions that cannot be taken within that context will not be listed, and no possible actions will be missed by the user.

The developers of the present invention sometimes refer to the multiplicity of balloons (e.g. 68A–68L) as "skeleton"™ help in that the aggregate image of a number of balloons is somewhat skeletal in appearance. With Skeleton help, virtually everything that can be accomplished within a single screen is shown simultaneously, and those things that cannot be accomplished within that screen or within that context are not shown. This provides a user with a very rapid, non-modal method for obtaining information on the proper operation of an application program. In a preferred embodiment of the present invention, the skeleton help is turned off such that the screen returns to that shown in FIG. 4A as the cursor 64 is moved away from the help button 68. Since this is non-modal help, it is not necessary for the user to reactivate the web page 34.

In FIGS. 5A–10B, some additional skeleton help examples will be described. To the extent that they operate similarly to previously described example, such description will not be repeated. However, where there are particular areas of interests, they will be pointed out.

Figure 5A:
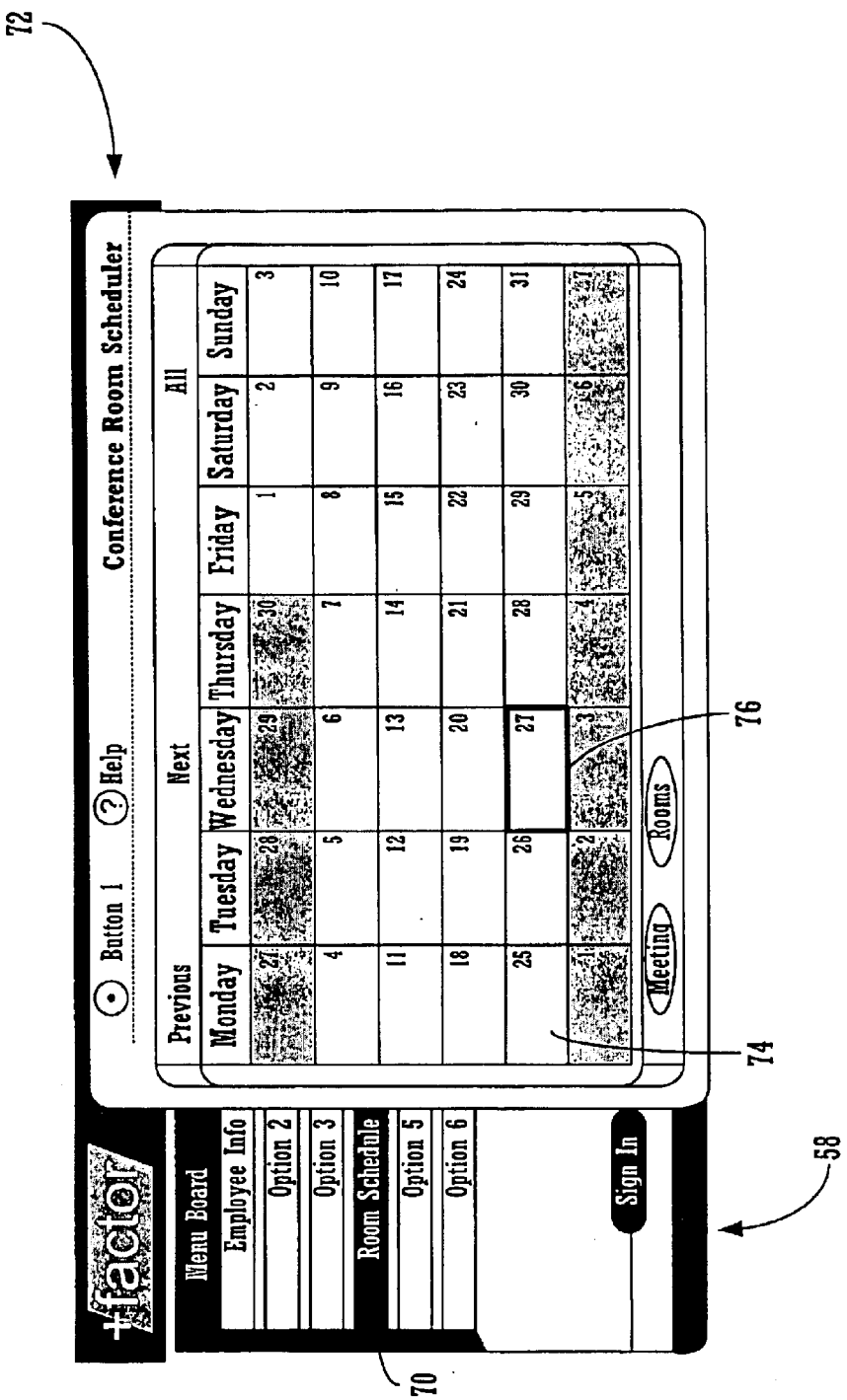
FIG. 5A is an illustration of a conference room scheduling screen.
Figure 5B:
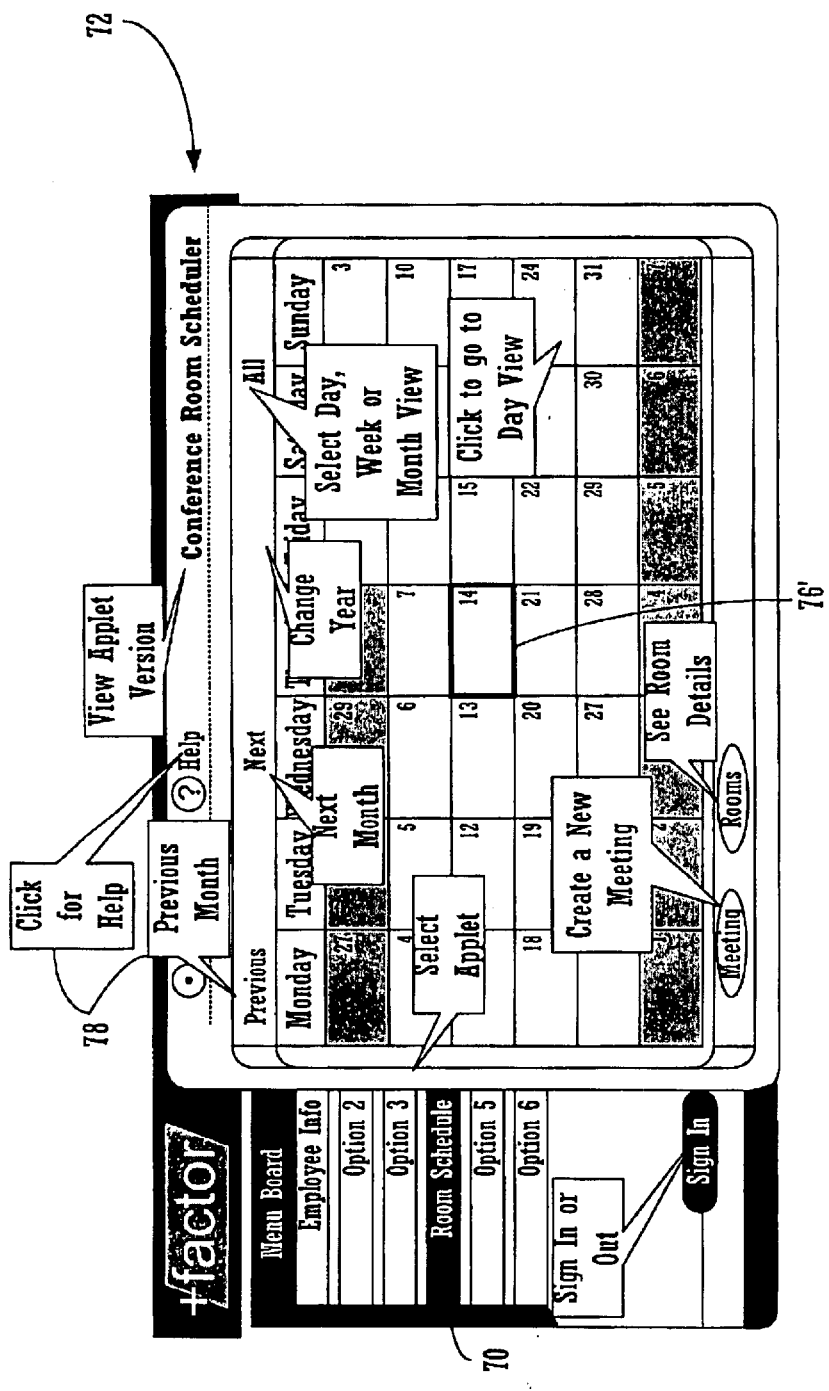
FIG. 5B is a view of non-modal help being provided with respect to the context of the view of FIG. 5A.

In FIG. 5A, a conference scheduler applet is activated by activating the button 70 in choosier section 58. This creates a calendar image 72 on the screen for a particular month. Months and years can be navigated in the normal fashion. The calendar image 72 is provided with indicia 74 to indicate that the conference room has already been scheduled on that date. Preferably the indicia provides an indication of the approximate time the room has been scheduled. The image 72 is also preferably provided with a indicia 76 to indicate the current day.

If the user selects skeletal help by moving the cursor into proximity with the help button, an alternative image 72' is displayed in place of the original image 72. It will again be noted that the image 72' is preferably visually distinctive, such as by shown in half tone, and is not the same as, but merely is representative of, the original image 72. For example, the current date on FIG. 5A is indicated to be the $27^{th}$ while the date in the example is the $14^{th}$. Balloons 78 provide help and comment in a verb/object paradigm.

Figure 6A:
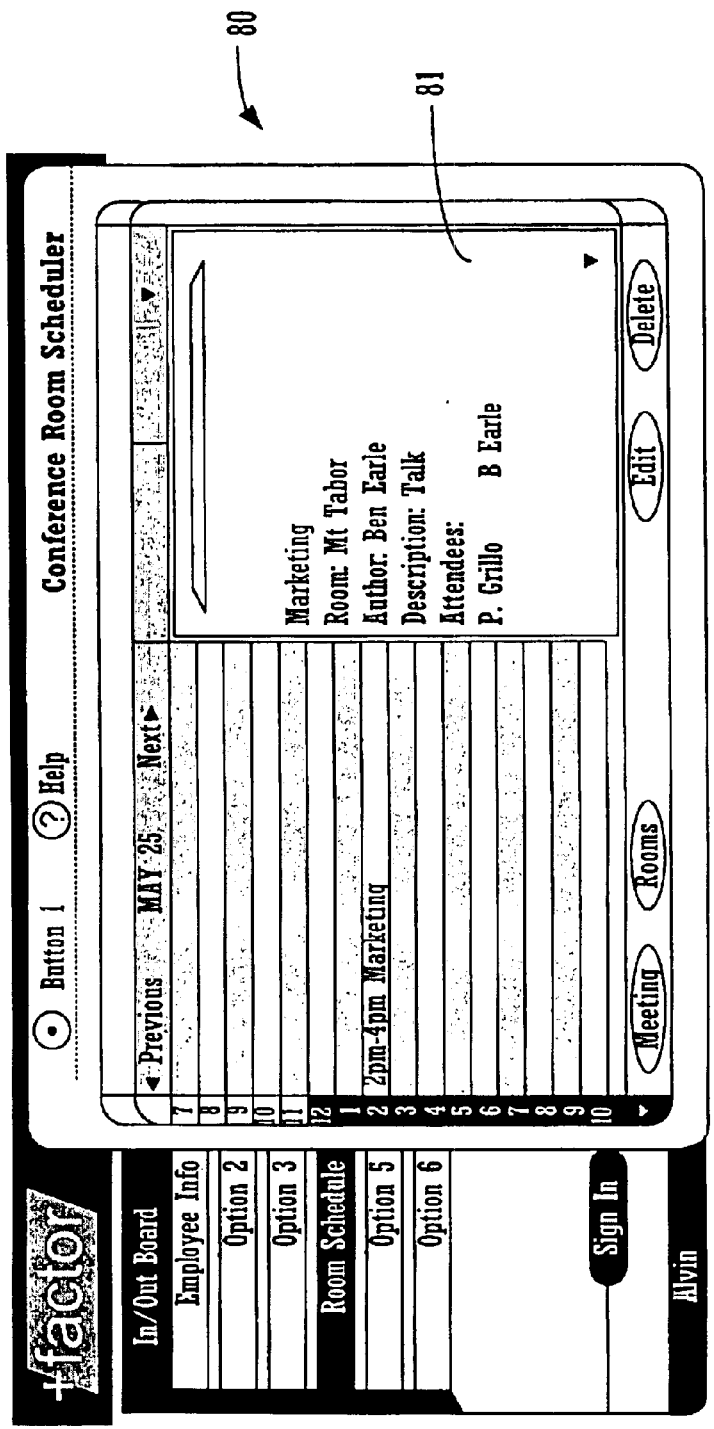
FIG. 6A is a view of the conference room scheduler in a day view.

In FIG. 6A a day view of conference room scheduler is illustrated. This screen 80 was obtain clicking on the date 25 of the screen 72 of FIG. 5A. As can be seen, a meeting has been scheduled in the conference room between 2 and 4 p.m. on the subject of marketing on May $25^{th}$. Additional information concerning the meeting is shown on the right of the screen.

Figure 6B:
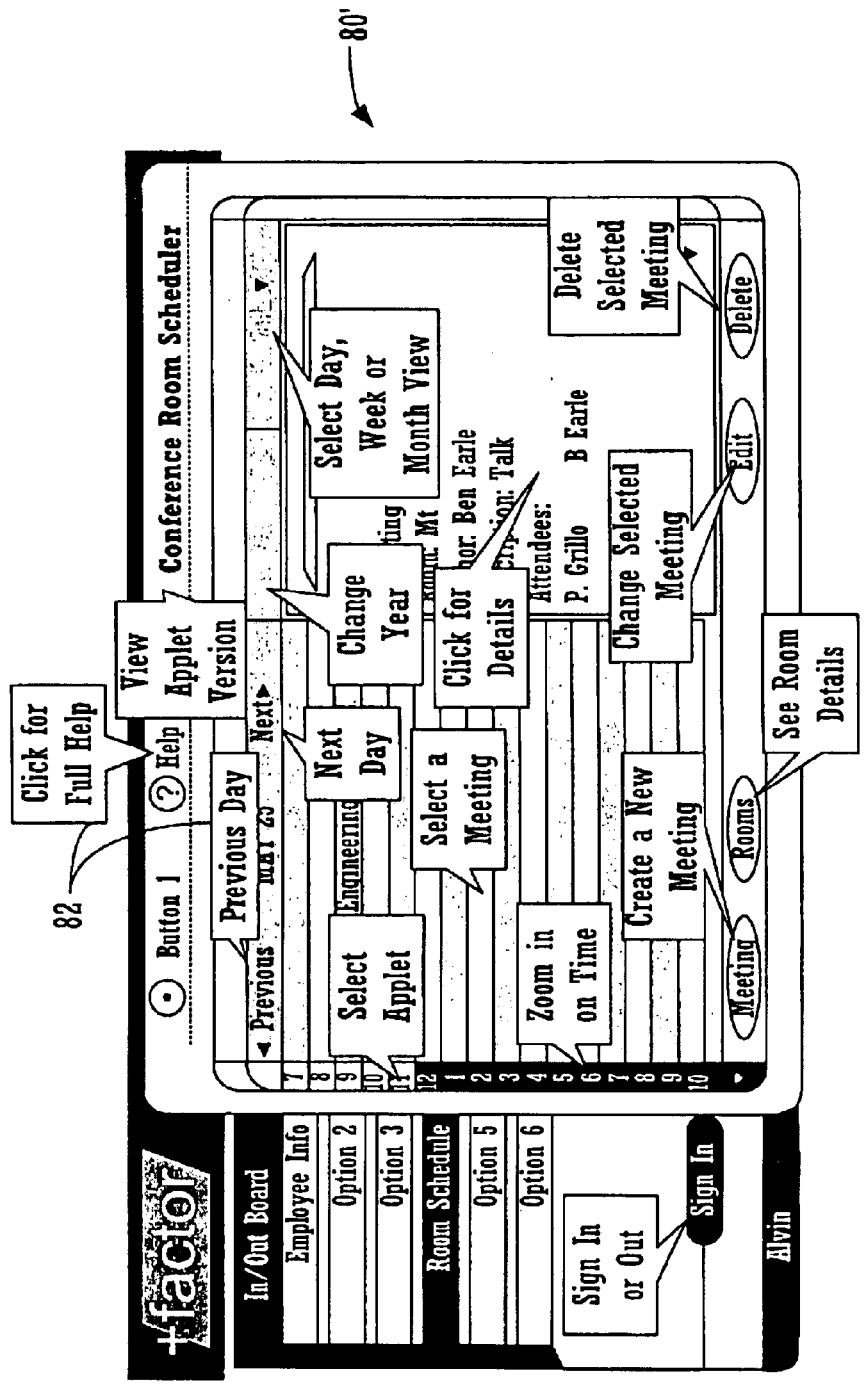
FIG. 6B is an illustration of non-modal help being provided for the context of the view of FIG. 6A.

In FIG. 6B an alternative screen 80' illustrates skeleton help for the conference schedule day view. A representative image of the day view screen is shown with the skeleton help balloons 82 providing skeleton help on a verb/object paradigm.

Figure 7A:
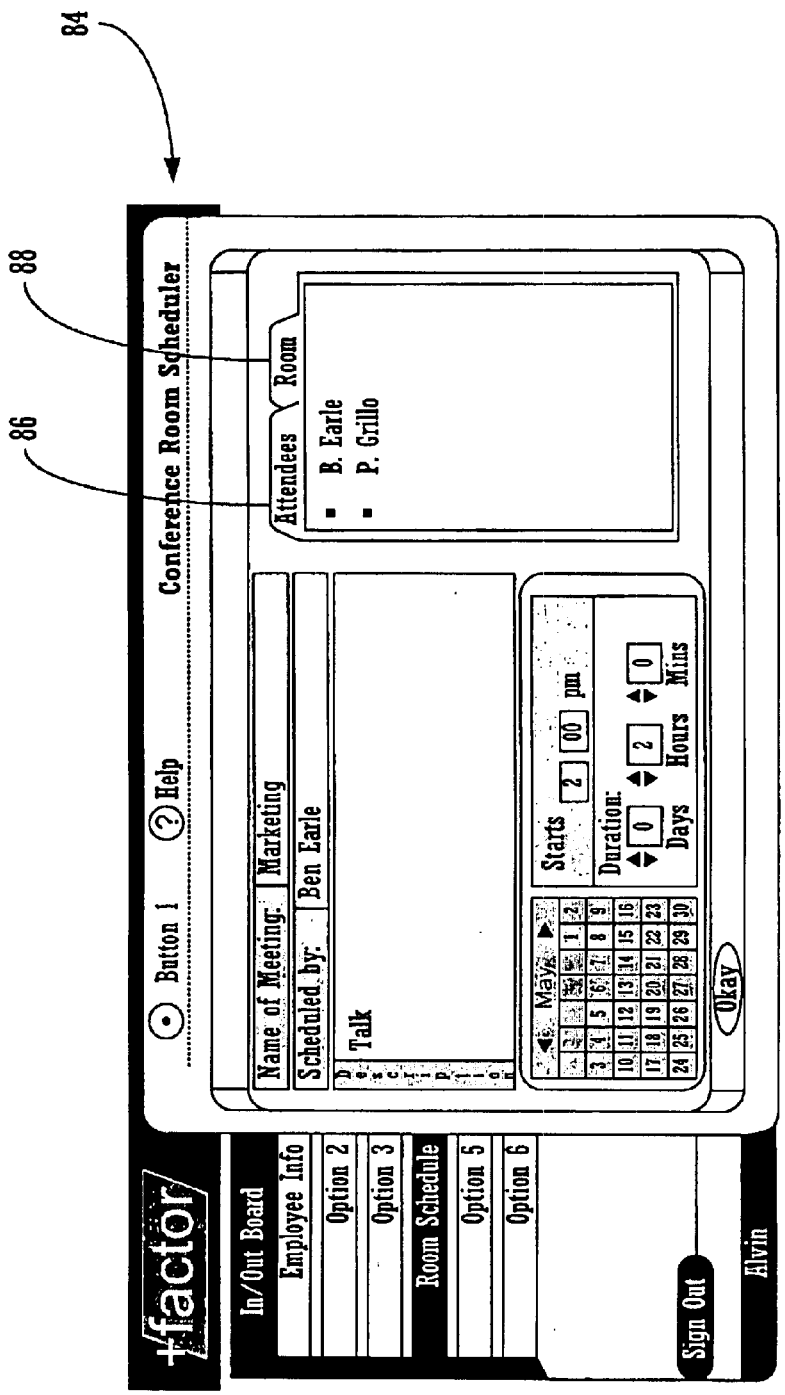
FIG. 7A is a view of a meeting with an attendee tab forward.

In FIG. 7A, an image 84 allows a user to view a meeting in greater detail. This window is accessed, in this example, by clicking on the area 81 of FIG. 6A to create the image 84. It should be noted that this image 84 in addition to including additional information concerning the meeting includes two tabs sections namely an attendee tab 86 and a room tab 88. In this instance, the attendee tab is forward creating a context wherein attendee information is desired.

Figure 7B:
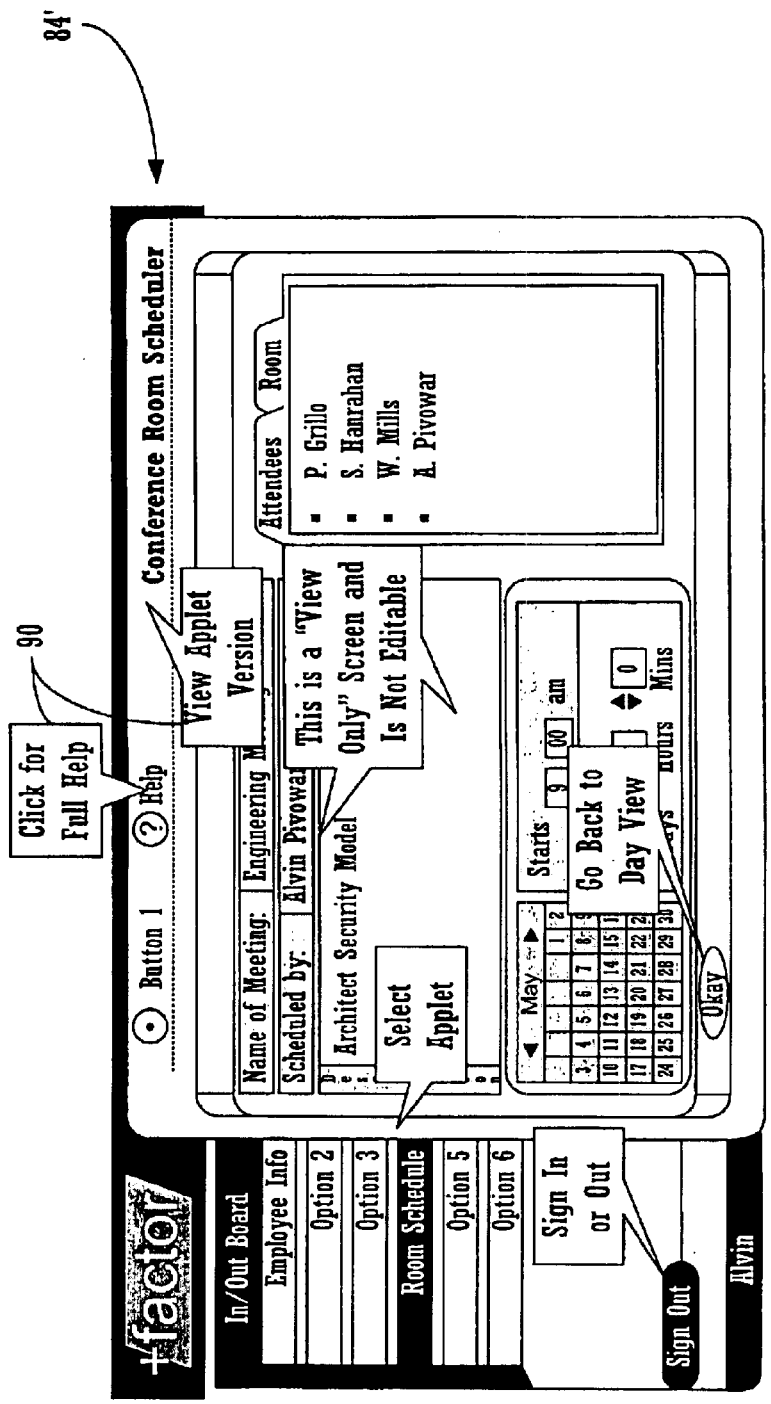
FIG. 7B is an illustration of non-modal help being provided within the context of the view of FIG. 7A.

In FIG. 7B, an image 84' provides skeleton help with regards to the image 84 of FIG. 7A. More particularly, an image 84' representing the image 84 (but not identical to the image 84) it is provided along with balloon help 90. It should be noted that the balloons 90 point to and describe only relevant areas of the image 84', i.e. only those areas that are relevant to the attendee tab. Items relevant to the room tab are displaced on this screen.

Figure 8A:
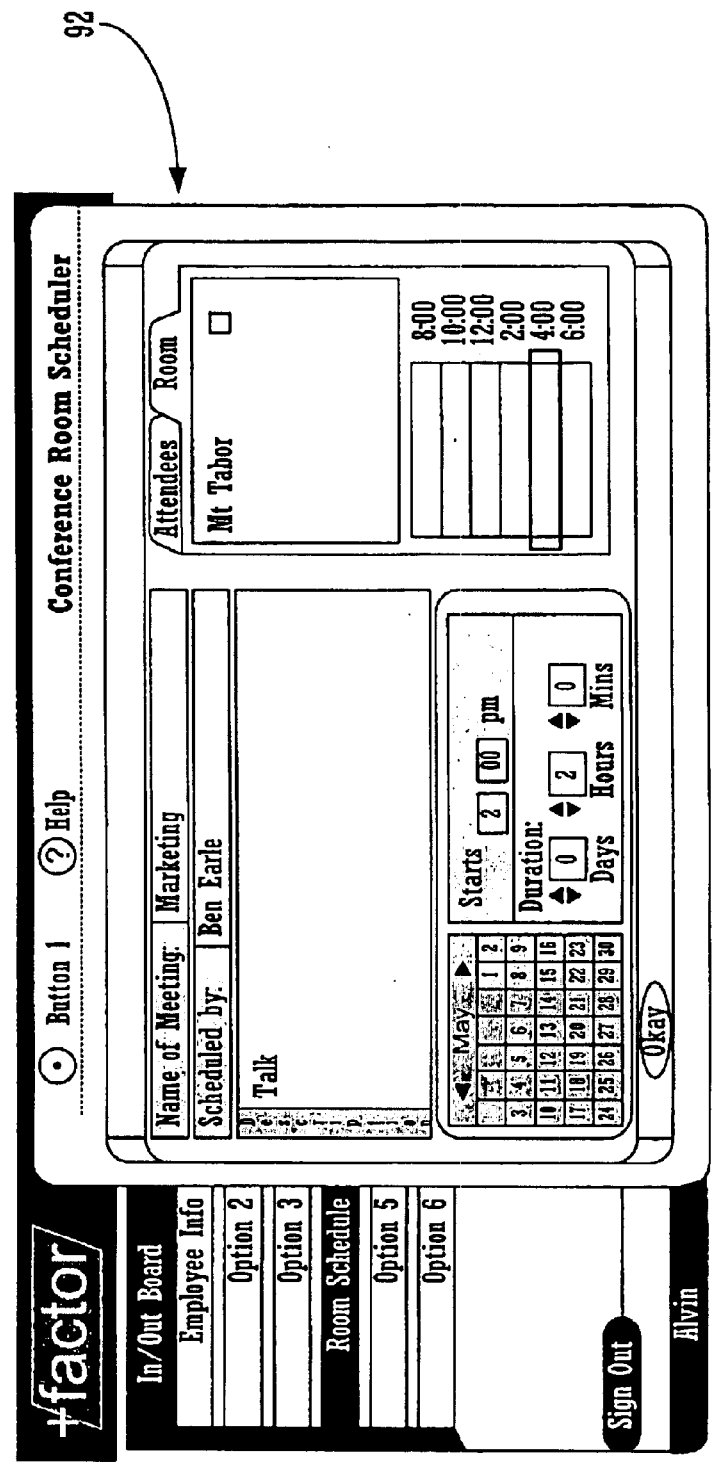
FIG. 8A is a view of a meeting with a room tab forward.

In FIG. 8A, an image 92 which is similar to the image 84 of 7A is shown. The difference between the image 92 and 84 is that the room tab has been activated in this image, while the attendee tab has been activated in the image 84 of FIG. 7A.

Figure 8B:
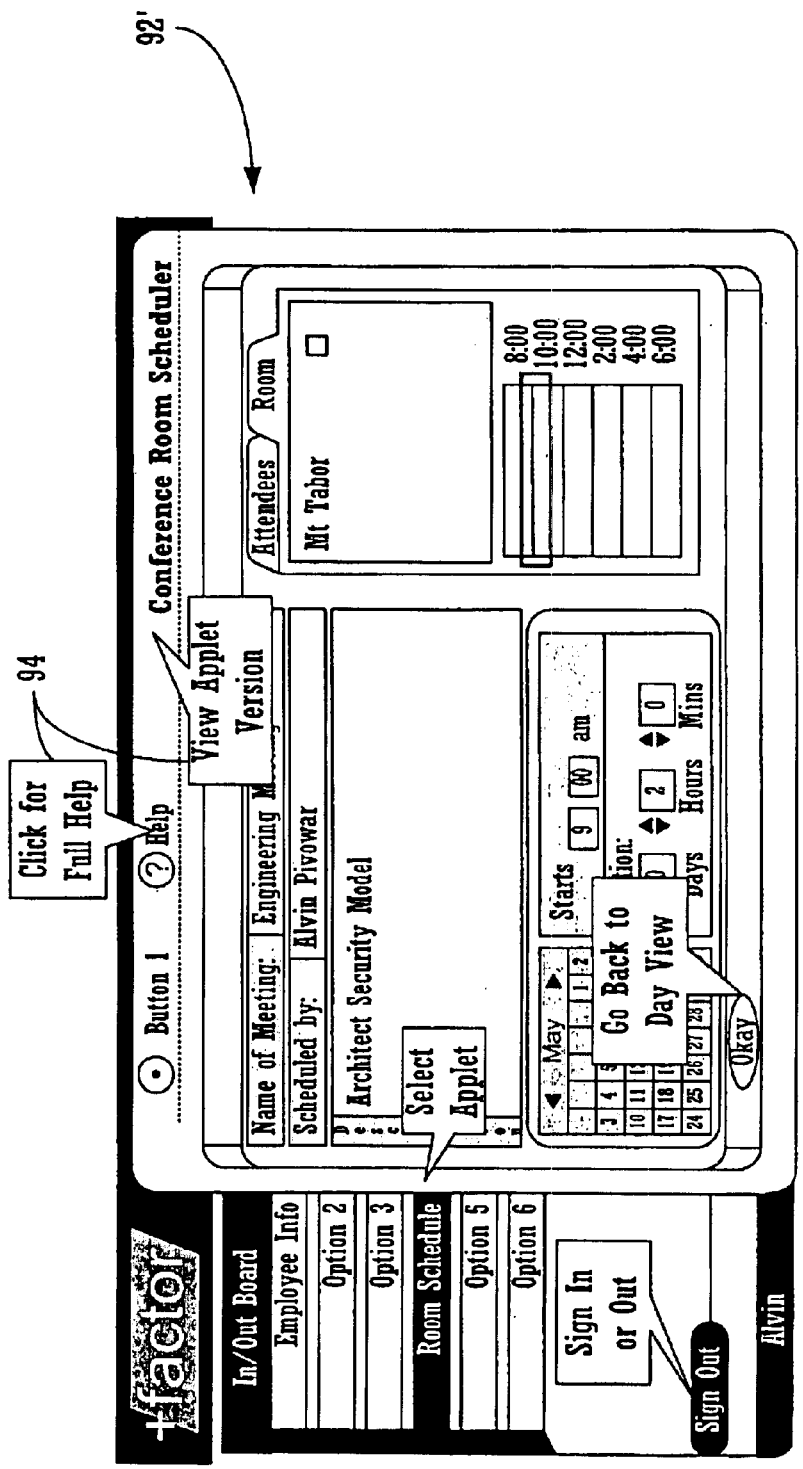
FIG. 8B is a view of non-modal help being provided within the context of the view of FIG. 8A.

In FIG. 8B, the skeleton help 92' of the image of 92 of FIG. 8A is illustrated. This image 92' includes balloon help 94. It should be noted, in particular, that the balloon help 94 for the image 92' is different than the balloon help 90 for the image 84' of FIG. 7B. This points again to an important aspect of this embodiment of the present invention in that it provides help on a context-sensitive basis.

Figure 9A:
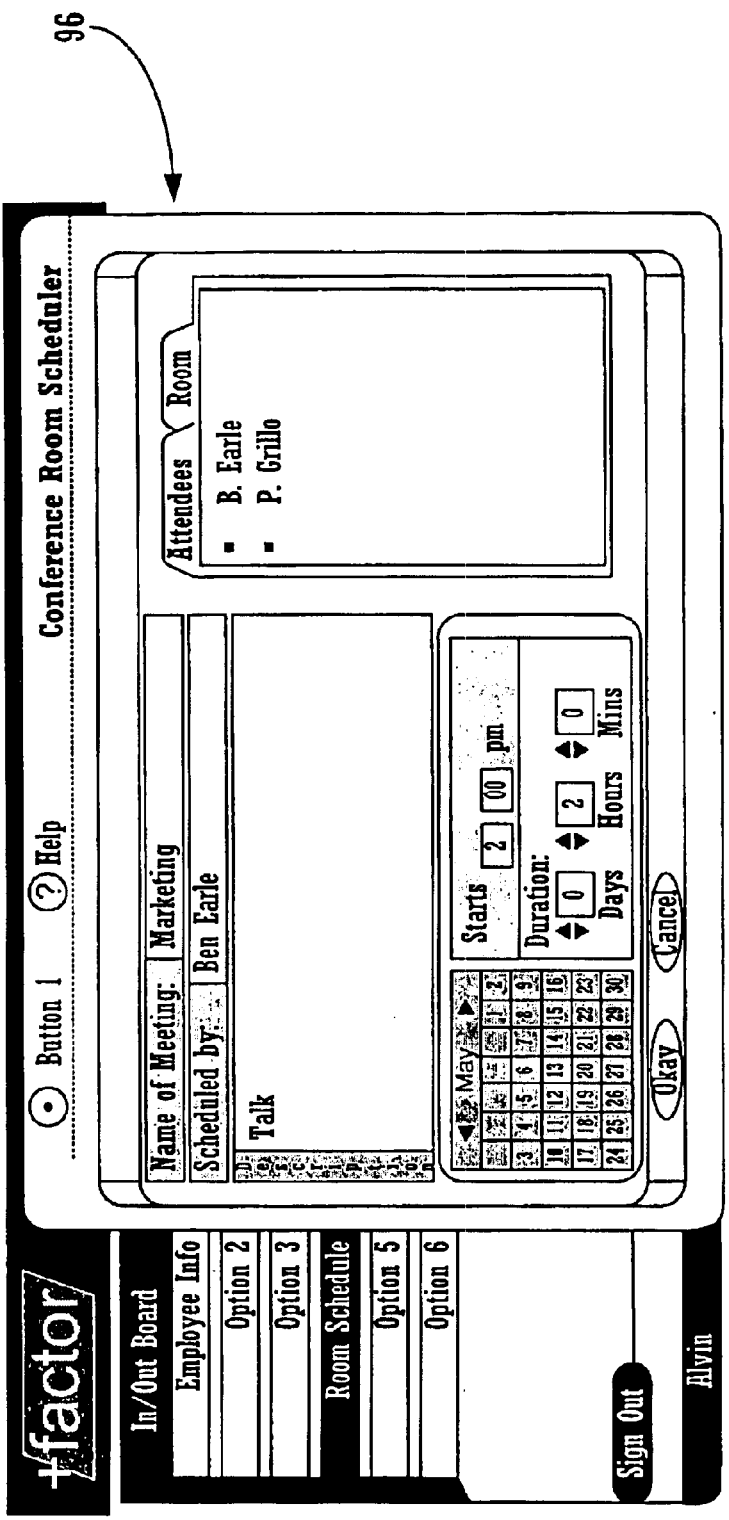
FIG. 9A is a view of an "edit a meeting" screen, with an attendee tab forward.
Figure 9B:
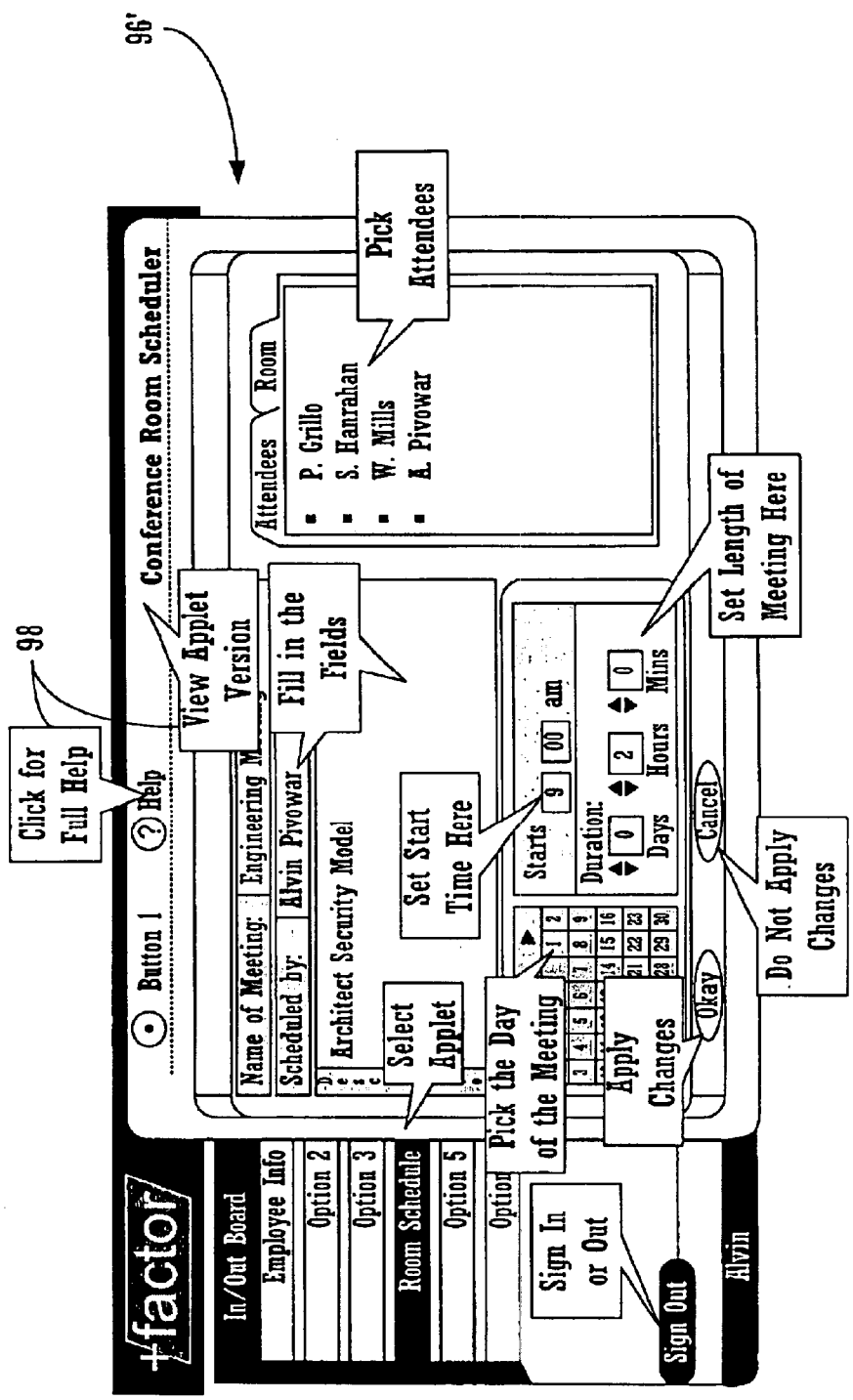
FIG. 9B is a view of non-modal help being provided within the context of the view of FIG. 9A.
Figure 10A:
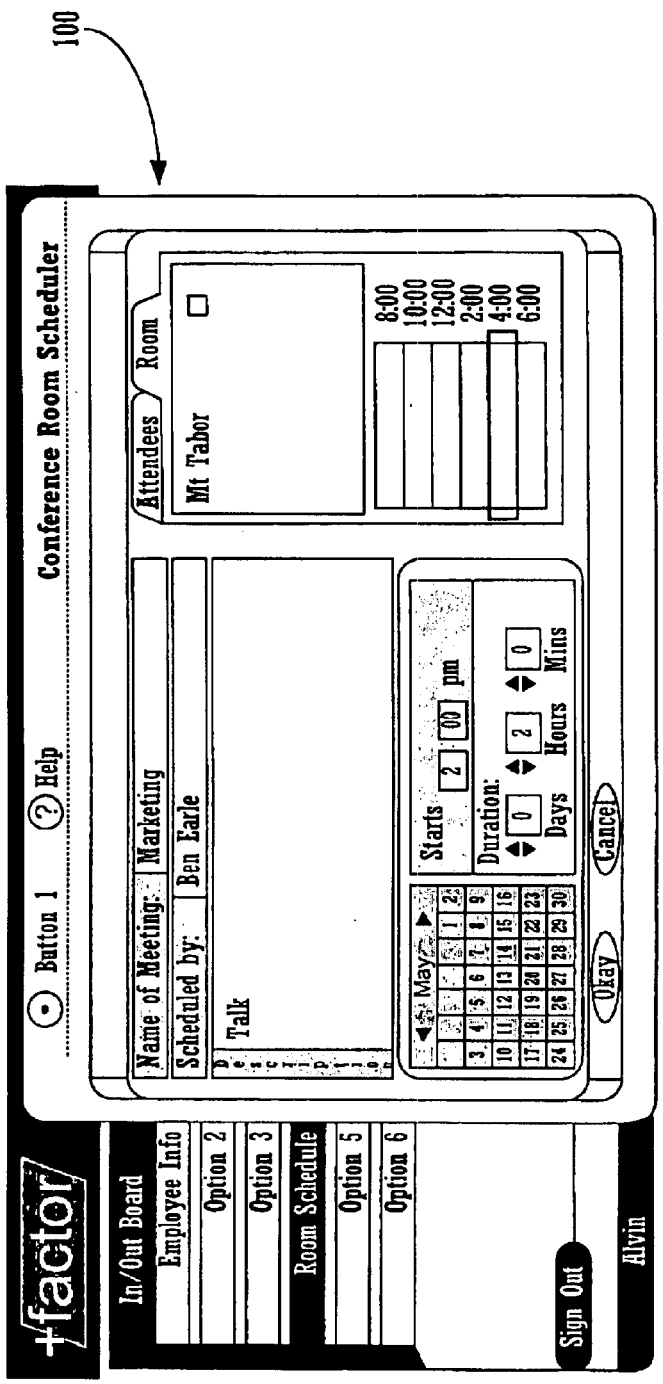
FIG. 10A is a view of an "edit a meeting" screen, with a room tab forward.
Figure 10B:
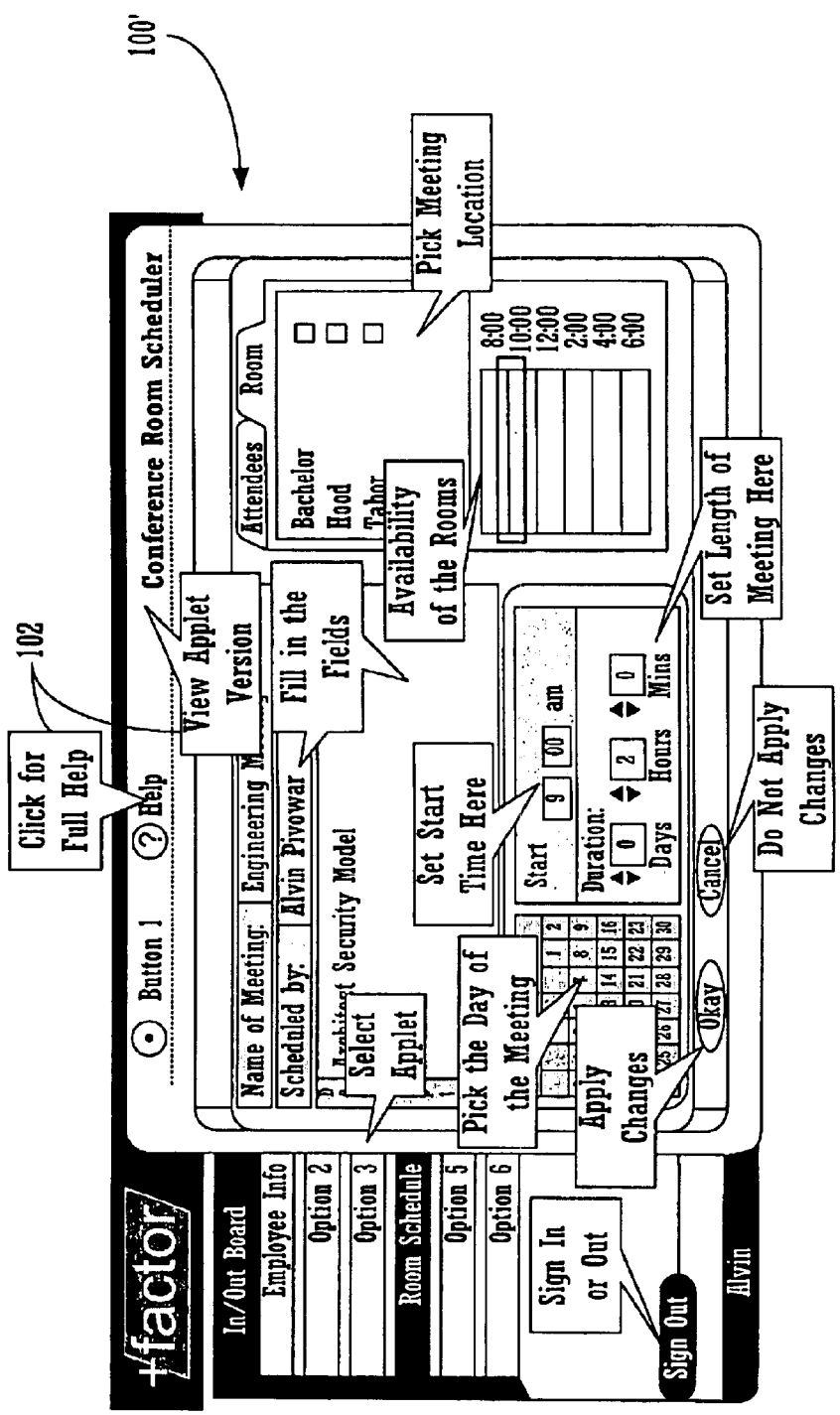
FIG. 10B is a view of non-modal help being provided within the context of the view of FIG. 10A.

The context-sensitive nature of the present invention is further illustrated in FIGS. 9A–10B. In FIG. 9A, a image 96 illustrates a "edit a meeting" functionality with the attendee tab forward. In FIG. 9B, the image 96' with balloon 98 provides context-sensitive skeleton help for the image 96 of FIG. 9A. FIG. 10A is similar to FIG. 9A, except that it is for editing a meeting with the room tab forward. That is, the image 100 has the room tab toward the right portion of the image forward and active. The image 100' in FIG. 10B has the balloons 102. It should be again noted that the balloons 102 (in aggregate) are different from the balloons 98 of FIG. 9B in that the room tab has been set for FIG. 10B while the attendee tab was set for FIG. 9B. By "in aggregate" it is mean that some of the balloons may be the same as in the previous version, but not all of the balloons are the same due to the change in context.

Figure 11A:
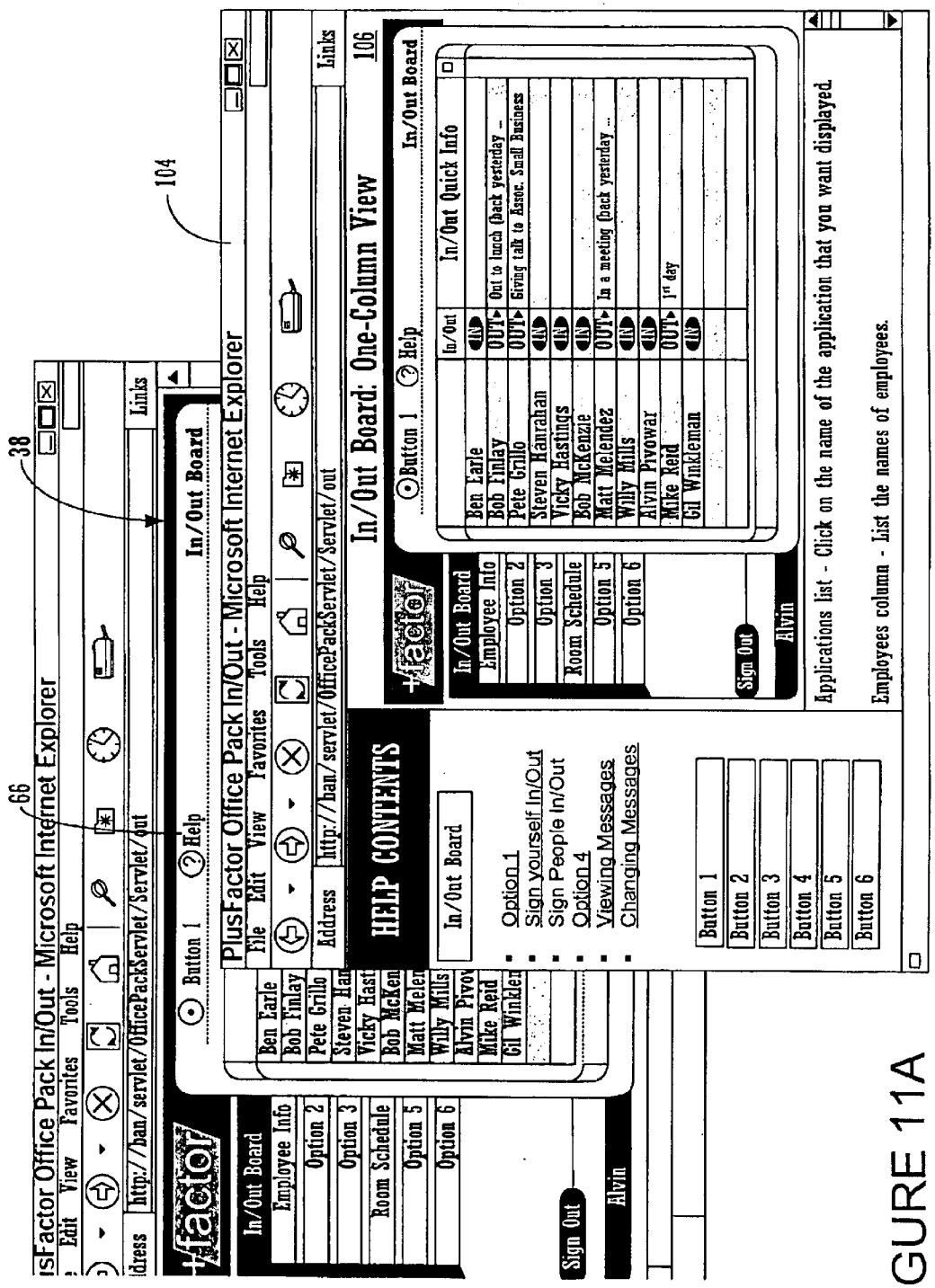
FIG. 11A is a view of a modal help screen in accordance with the present invention.

In FIG. 11A, modal help window has been activated. This is typically accomplished by clicking on the help button 66 of the web page 38. This action creates a new window 104 providing modal help 106. In this instance, the additional window is an additional web browser window.

Figure 11B:
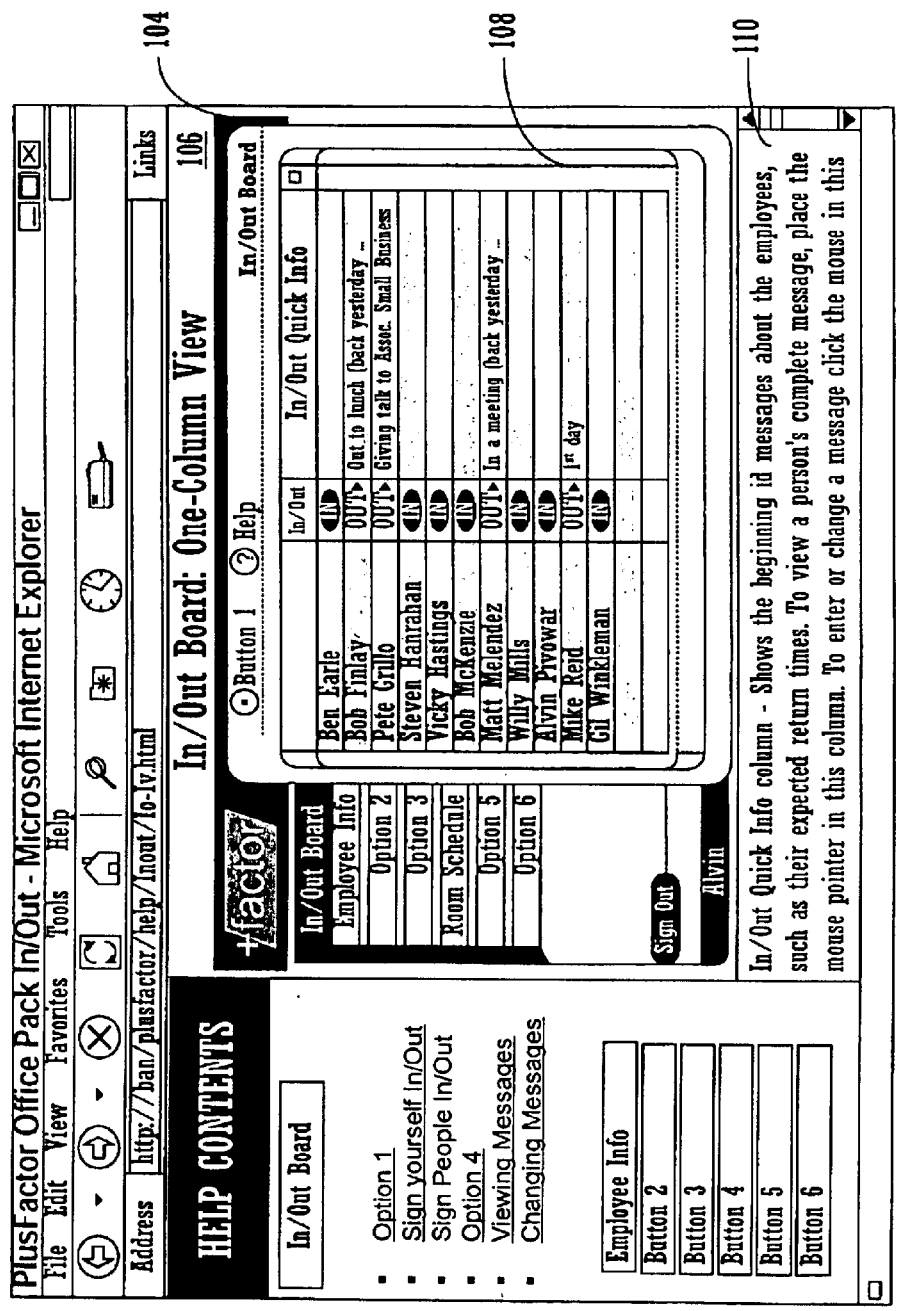
FIG. 11B is an additional view of modal help illustrating the navigation capabilities of modal help of the present invention.

In FIG. 11B, the web browser window 104 and help window 106 are illustrated. The modal help of the present invention uses graphical interface 108 to index a text portion 110. That is, to access information concerning the in/out quick info column, the graphical interface 108 is selected for in/out quick info and the textural information concerning the in/out quick info is displayed at 110.

Figure 12:
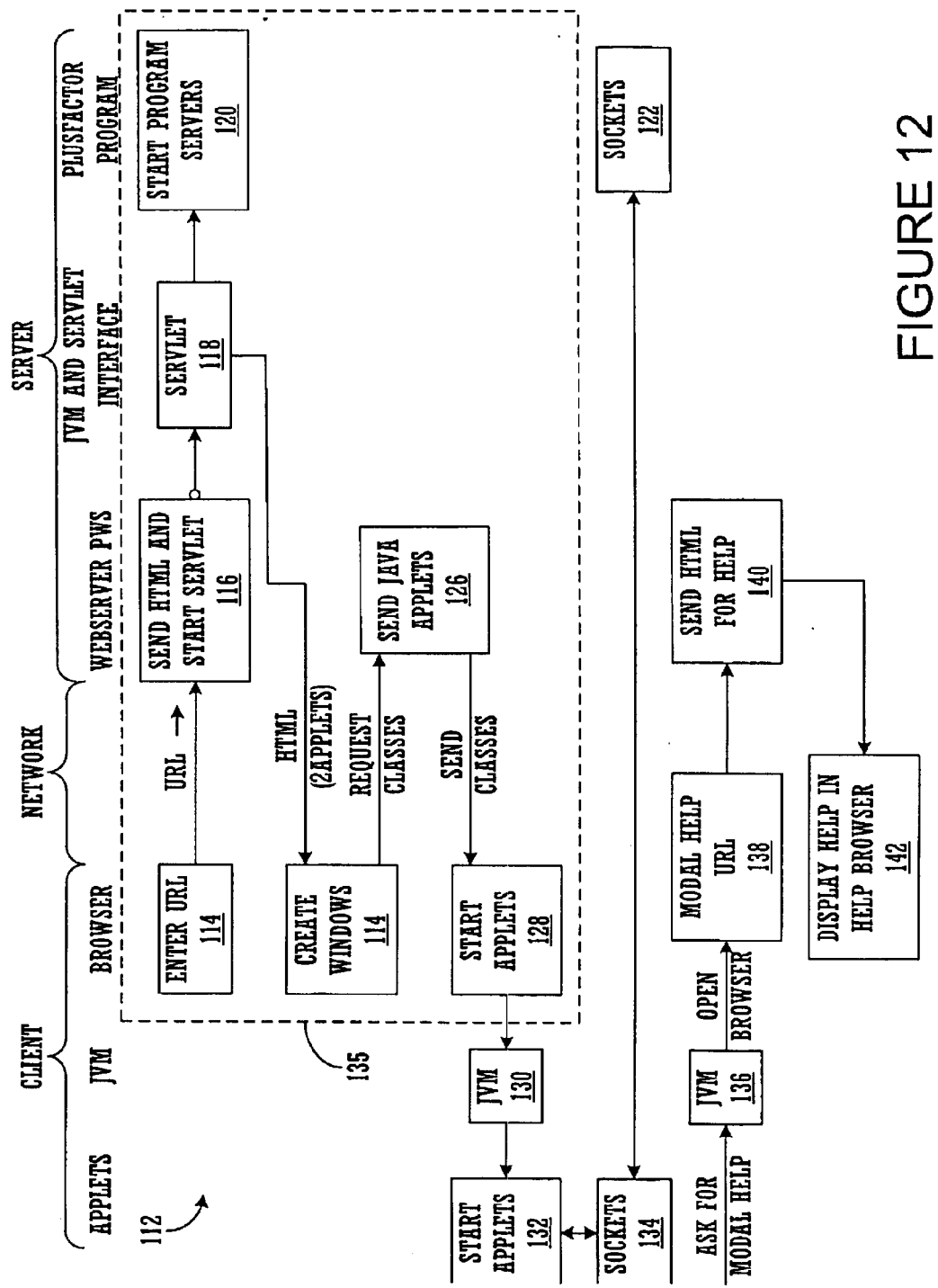
FIG. 12 is a process diagram illustrating a preferred process for a computerized help system in accordance with the present invention.

In FIG. 12, a process 112 for providing a help system in accordance with the present invention is shown in block diagram form. As noted previously, the processes of the present invention can be provided on a single computer, on a networked computer, between a client and server, etc. In this implementation, the process 112 is implemented over a TCP/IP network such as an Intranet or the Internet between a client or user computer and a server coupled to the network. The flow diagram of FIG. 12 is therefore divided into client, network, and server portions. The client portion of the process includes portions implemented by applets, by the Java Virtual Machine (JVM), and by the browser. The server side process is implemented by a web server, by a JVM and servlet interface, and by the application and help program of the present invention.

The process 112 is initiated from a browser of the client machine. This process has been described previously with reference to FIG. 3. The URL is entered into the computer in an operation 114 and a request is sent via the network to the web server as previously described.

The web server for this invention can be any suitable web server such as the Microsoft Personal Web Server (PWS). Alternatively, web servers are available from a variety of other vendors including Netscape Communications, Inc. In the case of the Microsoft PWS, an interface known as ISAPI is provided by Microsoft to allow for "bolting", i.e. to attach other programs to the web server. These other programs are typically handled by utilities known as servlets. Typically, a servlet initiates an application program and also provides HTML. A servlet is therefore used as a conduit from the ISAPA interface of the Microsoft PWS to the application program of the present invention. Serviettes for this purpose are sold commercially from such companies as New Atlanta and JRUN for both Microsoft and Netscape Communications web servers.

When the server receives the URL from the operation 114, the web server starts the servlet 118 which then creates HTML in the form of two applets which are passed back through the web server 116 to the client. The servile also initiates the program of the present invention at an operation 120 which starts them running in free running sockets 122.

While the use of sockets is well known to those skilled in the art, a little background will be given here for completeness. Before data is sent across the Internet from one host to another using TCP/IP, it is split into packets of varying but finite size called datagrams, which range in size from a few dozen bytes to about 60,000 bytes. Anything larger than this, and often things smaller than this, needs to be split into smaller pieces before it can be transmitted. The advantage is that if one packet is lost, it can be retransmitted without requiring redelivery of all other packets. Furthermore if packets arrive out of order they can be reordered at the receiving end of the connection. However, this is all transparent to the Java programmer. The host's native networking software transparently handles the splitting of data into packets on the sending end of a connection, and the reassembly of packets on the receiving end. Instead, the Java programmer is presented with a higher level abstraction called a "socket." The socket represents a reliable connection for the transmission of data between two hosts. It isolates the programmers from the details of packet encodings, lost and retransmitted packets, and packets that arrive out of order. There are four fundamental operations a socket performs. These are: connect to a remote machine; send data; receive data; and close the connection. A socket may not be connected to more than one host at a time.

The two HTML applets received from the servlet 118 create windows in an operation 124. The browser then requests classes from the server which are sent back to the browser by an operation 126. These classes comprise additional applets. The browser then initiates the start of the applets in an operation 128 which opens the Java Virtual Machine (JVM) in an operation 130 and which automatically starts the applets in an operation 132. The applets create sockets 134 which talk directly with the sockets 122 on the server. That is, once the process has been initiated the browser and web server are no longer intermediaries in the process and that the sockets 134 and 122 talk directly with each other over the network. To put it another way, everything inside box 135 is startup operation to initialize and start the socket 134 on the client and the socket program 122 on the server, which thereafter communicate directly with each other.

The applets 132 are the aforementioned applets in the list in the choosier section 58. If the current applets being run detects a request for modal help (by clicking on the help button) the Java Virtual Machine 136 is activated and a new browser window is opened. The modal help URL is provided in an operation 138, and is sent over the network to the server. The server will send the HTML for the help in an operation 140 and operation 142 will display the help in the browser window.

Figure 13:
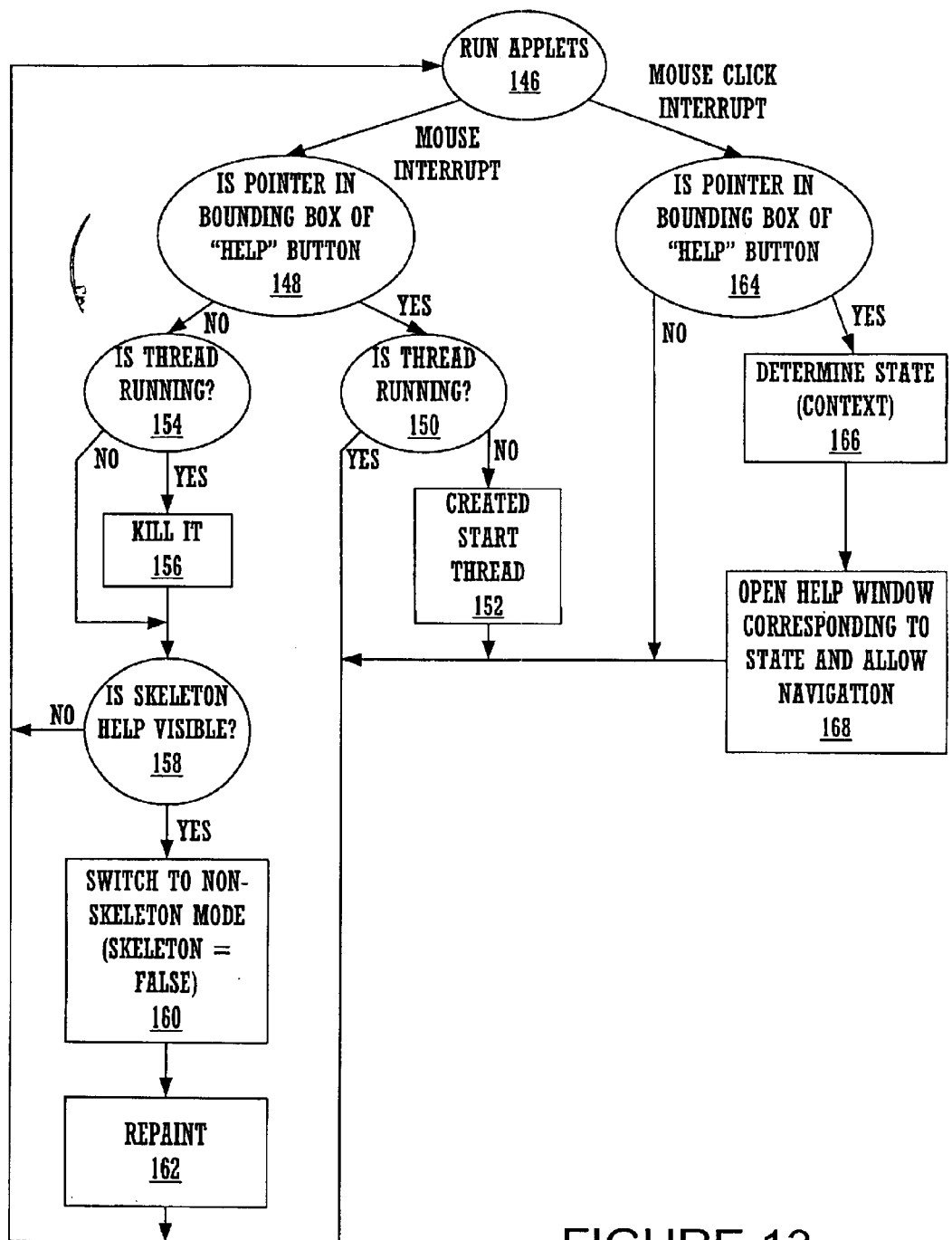
FIG. 13 illustrates a user input handling process in accordance with the present invention.
Figure 13A:
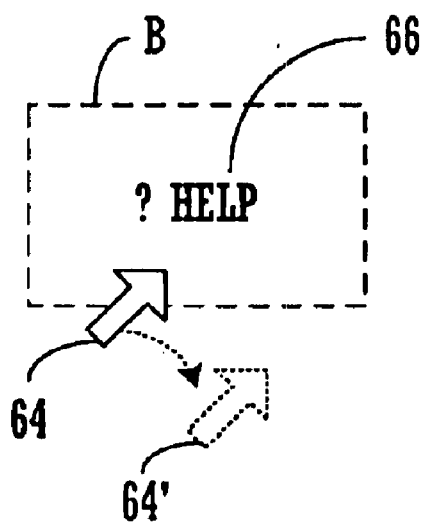
FIG. 13A illustrates a method for entering non-modal help in accordance with the present invention.

In FIG. 13, a process 144 for initiating non-modal and modal help in accordance with the present invention begins at 146 with the running of the applets. If there is a mouse interrupt, an operation 148 determines whether the pointer is in the bounding box of the help button. With brief reference to FIG. 13A, the help "button" 66 can be imagined to be surrounded by a invisible rectangular bounding box B. The cursor ("pointer") 64 can be thought to be inside the bounding box when any portion of the icon is within the bounding box B. When the cursor 64 is moved to a position 64' that is outside of the bounding box, it is considered to be no longer within the bounding box B.

Referring again to FIG. 13, if the pointer is in the bounding box of the help button an operation 150 determines whether there is a thread running. This thread is to handle the cursor detection. If not, this thread is created and started in operation 152. This operation 152 will be discussed in greater detail subsequently with respect to FIG. 15. Operational control is then returned to the applets in 146.

If operation 148 determines that the pointer is not in the bounding box of the help, it is determined in a step 154 whether the thread is running. If it is, this thread is killed in step 156. This is to eliminate threads after skeleton help is no longer being requested. Next, in an operation 158, it is determined whether a skeleton help is visible. If it is not, operation control is returned to applets at 146. If skeleton help is visible as determined by operation 158, an operation 160 switches to the non-skeleton mode. That is, the flag "skeleton" is set to false.

It is generally necessary to hide all children's in the view when you call skeleton help and then put them back after skeleton is no longer required. This is particularly true when using Java version 1.02 which has no "Z" order. By "Z" order, it is meant that the top window can be placed on top upon request. With systems such as Java version 1.02 that have no "Z" order, the children or underlying views must be explicitly hidden and then returned after the skeleton view is eliminated. This is accomplished in a repainting operation 162 which will be discussed in greater detail with reference to FIG. 14. Operational control is then returned to the applets 146.

The process 144 also detects a request for modal help. In the present invention, this is initiated by a mouse click interrupt wherein the cursor 64 is engaged with the button 66 and a button on the mouse is pressed. In operation 164 determines where the pointer is in the bounding box of the help button, and, if not, process control is returned to the applets 146. If the pointer is in the bounding box of the help button, an operation 166 determines the state or context in which help is requested and operation 168 opens a help window corresponding to the state and allows the navigation using the standard navigation controls of the web browser.

Figure 14:
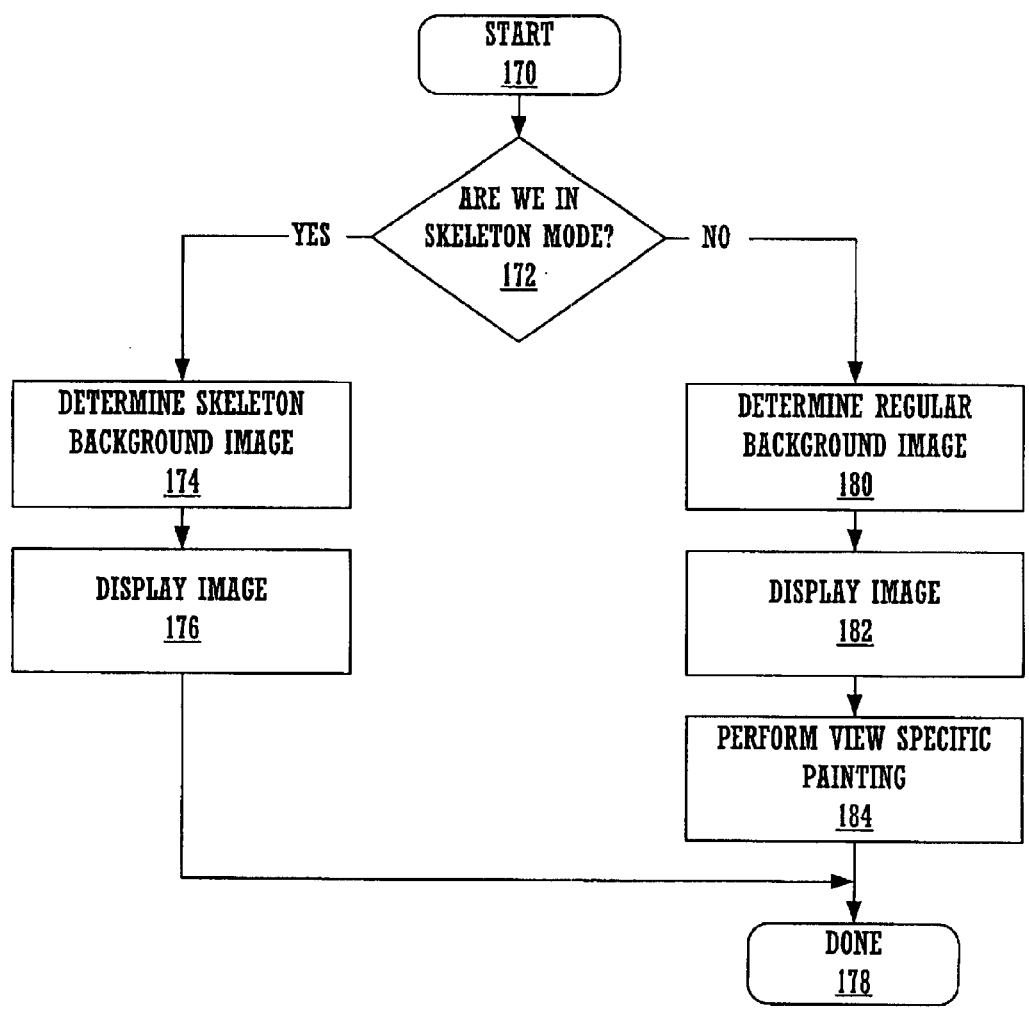
FIG. 14 is a flow diagram of the repaint process of FIG. 13.

In FIG. 14, the process 162 for reprinting of FIG. 13 is illustrated in greater detail. The process 162 begins at 170 and, in an operation 172, it is determined whether the process is currently in the skeleton mode. If it is, it is determined what is the proper skeleton background image for a database of images in operation 174 and the appropriate image is displayed in an operation 176. The operation 174 preferably uses a tree structure look-up to select the appropriate skeleton background image from a datebase based upon the context from which skeleton help was requested. The process is then completed at 178.

If operation 172 determines that the process is not currently in skeleton mode, it is determined that step 180 with the current regular background image should be. The image is then displayed in an operation 182 and view-specific painting is accomplished in an operation 184. The operation is then completed at 178.

Figure 15:
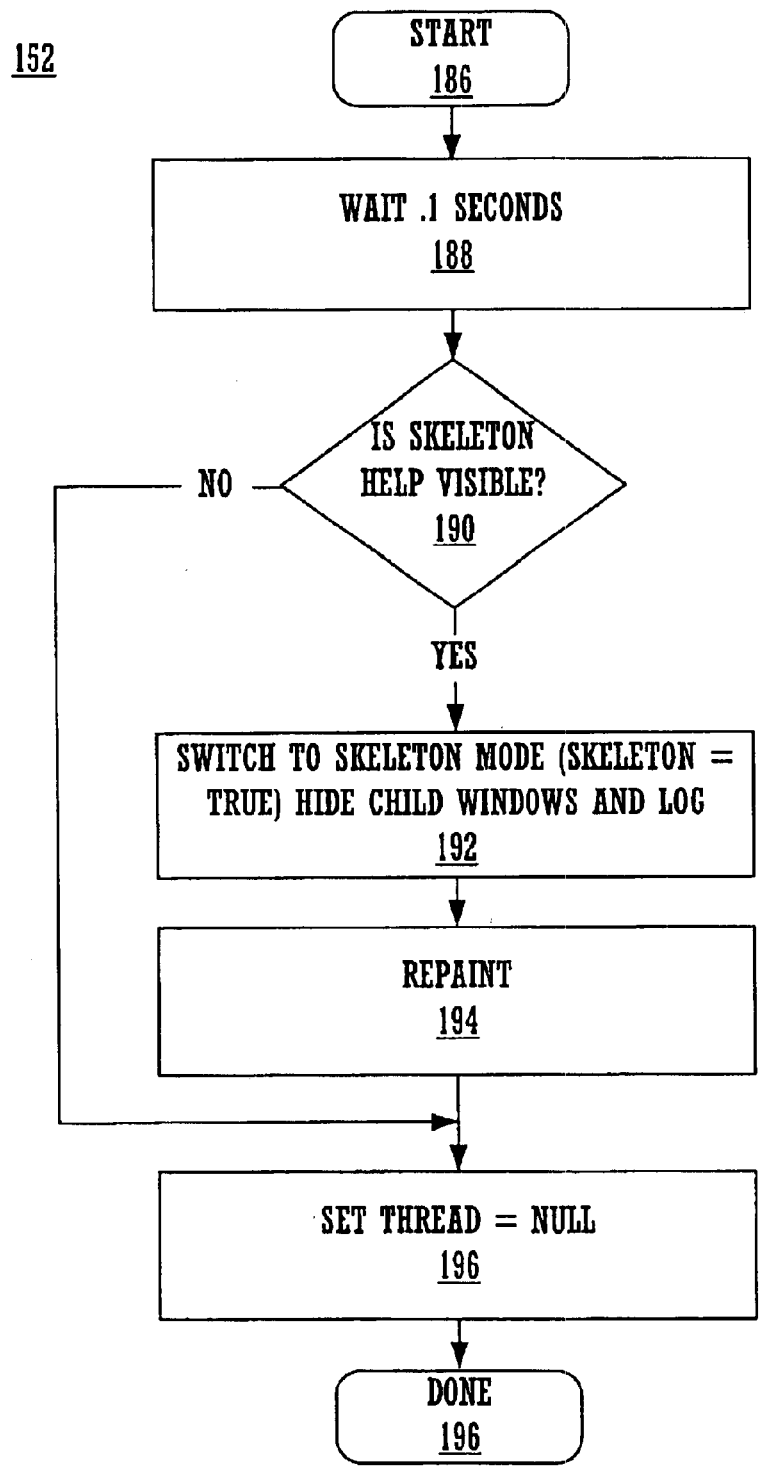
FIG. 15 is a flow diagram of the "create and start thread" process of FIG. 13.

In FIG. 15, the operation 152 of FIG. 13 is illustrated in greater detail. Operation 152 begins at 186 and, in an operation 188, there is a 0.1 second delay. The purpose of this delay is to prevent the accidental or inadvertent entry into skeleton help as the cursor or pointer is momentarily dragged through the bounding box B (see FIG. 13A). In other words, a small delay is inserted into the thread to ensure that the user was, indeed, attempting to reach the help button 66 and, therefore, skeleton help should be provided. After 0.1 second, an operation 190 determines whether the skeleton help is visible. If it is, an operation 192 switches to skeleton mode by setting the flag "skeleton" to true. Within this step 192, any appropriate children windows are hidden and logged so that they can be subsequently re-introduced. Next, at operation 194 causes a repaint, and operation 196 sets the thread to "null". Operation 152, (i.e. the execution of the skeleton thread) is then completed at 198.

It will therefore be appreciated that a computerized non-modal help system of the present invention includes a display screen providing a window for a number of output displays of an application program, a collection of pre-defined images mapped to the output displays by their context, a user input device for initiating non-modal help, and a non-modal displayer which displays one of the pre-defined images within the window in the place of its contextually-related output display. Preferably, the pre-defined images are stored as static bit map images including a dithered representation of the context in which the help was requested and a number of help balloons strategically positioned on the dithered image. Even more preferably, the balloons are positioned manually by a graphic artist to maximize their placement on the dithered image. By providing a balloon to described the functionality of every (or most) of the active elements, a user is provided with a quick framework or "skeleton" view of the meaning and operation of the various elements in the display. The predefined images are preferably accessed by a simple database algorithm which maps the environment from which the user is requesting help to an appropriate help image. Methods and formats for storing predefined images in compressed and uncompressed forms are well known to those skilled in the art, as are methods for storing and retrieving images from a database of images.

In one preferred embodiment of the present invention, the screen and the user input device form a part of a client computer system. As noted above, the help system can further include a server computer system coupled to the client computer system, such as by a TCP/IP network. Common forms of TCP/IP networks are referred to as Intranets, Extranets and the Internet. In the networked embodiment of the present invention, the client computer system supports a browser process, and the server computer system supports a server process. The computerized processes running on the client computer system comprise Applets that are delivered from the server computer system to the client computer system via the network. However, once the Applets are running on the client computer system, they communicate directly with the server processes through, for example, sockets in a Java-based system.

In another aspect of the present invention, a computerized help system includes a display screen providing a process window for a number of output displays of a computerized process, a user input device for initiating non-modal and modal help, non-modal help for displaying help within the process window in response to a request for non-modal help by the user, and modal help for displaying help within a help window in response to a request for modal help by the user. Preferably, the user input device is a pointer mechanism such as a mouse, trackball, touch-pad, joystick, etc., wherein the modal help is initiated by a help button displayed on the screen. The non-modal help is preferably initiated by a pointer positioned under the control of the user within a predetermined distance of the help button. The non-modal help preferably includes a collection of pre-defined bitmap images contextually related to the output displays, where each bitmap image includes a non-literal representation of its related output display and textual help within the representation.

A method for providing non-modal help in accordance with the present invention includes the operations of detecting a user request for non-modal help with respect to a dynamic application display, determining a context of the dynamic application display, retrieving a static image contextually related to the dynamic application display, where the static image includes a non-literal representation of the dynamic application display and textual help within the representation, and displaying the static image in the place of the dynamic application display.

While this invention has been described in terms of several preferred embodiments, it is contemplated that alternatives, modifications, permutations and equivalents thereof will become apparent to those skilled in the art upon a reading of the specification and study of the drawings. It is therefore intended that the invention be interpreted as including all such alternatives, modifications, permutations and equivalents as fall within its true spirit and scope.

What is claimed is:

1. A computerized non-modal help system comprising:
   a display screen providing a window for a plurality of output displays of computerized processes, said plurality of output displays being associated with a respective plurality of contexts;
   a collection of pre-defined images mapped to said plurality of output displays by said contexts, where each image includes a non-literal representation an output display to which it is mapped and textual help within said representation;
   a user input device for initiating non-modal help; and
   a non-modal displayer displaying a pre-defined image within said window in place of an output display to which it is mapped that was present at the time of said initiation of non-modal help, wherein said predefined image includes non-modal skeleton help simultaneous display of a plurality of help balloons using a verb/object paradigm in response to a user request for non-modal help.

2. A computerized non-modal help system as recited in claim 1 wherein said predefined images are stored as static bitmap images, and wherein said output displays are dynamic displays created by said computerized processes.

3. A computerized non-modal help system as recited in claim 2 wherein said output displays include output display elements and wherein said pre-defined images includes bitmap image elements that are contextually related to said output display elements.

4. A computerized non-modal help system as recited in claim 3 wherein said predefined image is displayed within said window such that bitmap image elements are aligned with corresponding output display elements.

5. A computerized non-modal help system as recited in claim 4 wherein said textual help of said pre-defined images comprise a plurality of balloons enclosing textual help and pointing to one or more bitmap image elements.

6. A computerized non-modal help system as recited in claim 3 wherein said bitmap images are visually distinguishable from said output displays.

7. A computerized non-modal help system as recited in claim 6 wherein said bitmap images are dithered representations of a context related to said output displays.

8. A computerized non-modal help system as recited in claim 1 wherein said display screen and said user input device form a part of a client computer system, and further comprising a server computer system coupled to said client computer system.

9. A computerized non-modal help system as recited in claim 8 wherein said client computer system and said server computer system are coupled together by a TCP/IP network.

10. A computerized non-modal help system as recited in claim 9 wherein said client computer system supports a browser process and wherein said server computer system supports a server process.

11. A computerized non-modal help system as recited in claim 10 wherein said computerized processes comprise Applets delivered from said server computer system to said client computer system via said network and executing on said client computer system in a virtual machine process.

12. A computerized non-modal help system as recited in claim 11 wherein said delivery of said Applets is initiated via said browser on said client computer system by providing a URL of said server process.

13. A computerized non-modal help system as recited in claim 12 wherein said server process initiates a server-side program in response to the provision of said URL by said browser.

14. A computerized non-modal help system as recited in claim 13 wherein said Applets communicate directly with said server-side program via said network without the intermediaries of said browser and said server process.

15. A computerized non-modal help system as recited in claim 14 wherein said Applets and said server-side program communicate through sockets.

16. A method for providing non-modal help comprising:
    detecting a user request for non-modal help with respect to a dynamic application display;
    determining a context of said dynamic application display;
    retrieving a static image contextually related to said dynamic application display, where said static image includes a non-literal representation of said dynamic application display and textual help within said representation; and
    displaying said static image in the place of said dynamic application display, wherein said static image includes non-modal non-modal skeleton help simultaneous display of a plurality of help balloons using a verb/object paradigm in response to said user request for non-modal help.

17. A method for providing non-modal help as recited in claim 16 wherein detecting a user request for non-modal help comprises detecting the approach of a cursor to an icon.

18. A method for providing non-modal help as recited in claim 17 wherein said icon is a help button, and wherein the selection of said help button provides modal help in a help window.

19. A method for providing non-modal help as recited in claim 16 wherein said static images are bitmap images.

20. A method for providing non-modal help as recited in claim 19 wherein said bitmap images comprise a plurality of balloon enclosing textual help and pointing to one or more bitmap image elements.

21. A method for providing non-modal help as recited in claim 20 wherein said bitmap images are visual distinguishable from said dynamic application display.

22. A method for providing non-modal help as recited in claim 21 wherein said bitmap images are dithered representation of a context related to said dynamic application display.

23. A method for providing non-modal help as recited in claim 16 wherein the process is initiated on a client computer system by making a call to a server computer system.

24. A method for providing non-modal help as recited in claim 23 wherein said process is initiated on said client computer system with a browser process making a call to a server process on said server computer system.

25. A method for providing non-modal help as recited in claim 24 wherein a client side process is executing on said client computer system and a server-side process is executing on said server computer system, and wherein said client-side process is in communication with said server-side process without the intermediaries of said browser process and said server process.

26. A computer readable medium provided with computer program instructions for implementing the method of claim 16.

27. A help system comprising:
    means for detecting a user request for non-modal help with respect to a dynamic application display;
    means for determining a context of said dynamic application display;
    means for retrieving a static image contextually related to said dynamic application display, where said static image includes a non-literal representation of said dynamic application display and textual help within said representation; and
    means for displaying said static image in the place of said dynamic application display, wherein said static image includes non-modal non-modal skeleton help simultaneous display of a plurality of help balloons using a verb/object paradigm in response to said user request for non-modal help.

28. A help system as recited in claim 27 wherein said means for detecting a user request for non-modal help comprises means for detecting the approach of a cursor to an icon.

29. A help system as recited in claim 28 wherein said icon is a help button, and means for providing modal help in a help window upon the selection of said help button.

30. A help system as recited in claim 27 wherein said help system is implemented with a client computer means and a server computer means.

31. A help system as recited in claim 30 further comprising browser means on said client computer means and web server means on said server computer means.

32. A help system as recited in claim 31 further comprising communication means between said client computer means and said web computer means other than via said browser means and said web server means.

* * * * *